United States Patent
Greenbaum

(10) Patent No.: US 12,423,650 B2
(45) Date of Patent: *Sep. 23, 2025

(54) SYSTEMS AND METHODS OF WIRELESS COMMUNICATION FOR INVENTORY MANAGEMENT

(71) Applicant: GLAS, INC., Inglewood, CA (US)

(72) Inventor: Sean Greenbaum, Los Angeles, CA (US)

(73) Assignee: GLAS, INC., Inglewood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,876

(22) Filed: Dec. 21, 2023

(65) Prior Publication Data

US 2024/0127174 A1    Apr. 18, 2024

Related U.S. Application Data

(63) Continuation of application No. 17/548,846, filed on Dec. 13, 2021, now Pat. No. 11,887,053, which is a
(Continued)

(51) Int. Cl.
*G06Q 10/087* (2023.01)
*G06K 19/07* (2006.01)
(Continued)

(52) U.S. Cl.
CPC ....... *G06Q 10/087* (2013.01); *G06K 19/0723* (2013.01); *H04W 4/021* (2013.01); *H04W 4/80* (2018.02)

(58) Field of Classification Search
CPC ...... G06Q 10/087; H04W 4/80; H04W 4/021; G06K 19/0723
See application file for complete search history.

(56) References Cited

U.S. PATENT DOCUMENTS 9,565,513 B1   2/2017   Malek et al.
10,039,327 B2 * 8/2018   Cameron ................. H05B 3/12
(Continued)

FOREIGN PATENT DOCUMENTS

WO   WO-2018/202651 A1   11/2018

OTHER PUBLICATIONS

U.S. Appl. No. 17/030,707 entitled "Vaporization Device Having Remotely Controllable Operational Modes" filed Sep. 24, 2020.
(Continued)

*Primary Examiner* — Aryan E Weisenfeld
(74) *Attorney, Agent, or Firm* — MARSHALL, GERSTEIN & BORUN LLP

(57) ABSTRACT

Systems, devices, and methods for automatically monitoring and managing inventory in real time within a retail environment are presented. To monitor and manage inventory of electronic devices configured to communicate wirelessly, the electronic devices are configured to send device status messages via wireless communication to wireless connection devices, which in turn send inventory messages to a remote inventory server via a communication network. To monitor non-communicating inventory, wireless tags are included within or affixed to inventory packaging to communicate with the electronic devices or wireless connection devices. Based upon such inventory messages, the remote inventory server monitors inventory location and levels at retail locations. Inventory levels may be adjusted according to inventory distribution plans based upon such inventory information.

20 Claims, 10 Drawing Sheets

Related U.S. Application Data continuation of application No. 17/234,733, filed on Apr. 19, 2021, now Pat. No. 11,200,535, which is a continuation-in-part of application No. 17/065,825, filed on Oct. 8, 2020, now Pat. No. 10,984,380.

(51) Int. Cl.
*H04W 4/021* (2018.01)
*H04W 4/80* (2018.01)

(56) References Cited

U.S. PATENT DOCUMENTS

| | | | |
|---|---|---|---|
| 10,531,693 B1 | 1/2020 | Greenbaum | |
| 10,653,189 B1 | 5/2020 | Greenbaum | |
| 10,685,326 B1 | 6/2020 | Ewing et al. | |
| 10,750,791 B1 | 8/2020 | Greenbaum | |
| 10,757,980 B1 | 9/2020 | Greenbaum | |
| 10,786,013 B2 | 9/2020 | Greenbaum | |
| 10,984,380 B1 | 4/2021 | Greenbaum | |
| D931,524 S | 9/2021 | Greenbaum et al. | |
| 11,200,535 B1* | 12/2021 | Greenbaum | G06K 19/0723 |
| 11,790,192 B1* | 10/2023 | Pesavento | G06K 7/10128 |
| | | | 340/572.1 |
| 2004/0143505 A1* | 7/2004 | Kovach | G06Q 10/087 |
| | | | 705/23 |
| 2007/0018820 A1* | 1/2007 | Chand | G01S 19/48 |
| | | | 340/572.1 |
| 2010/0205044 A1 | 8/2010 | Scheer | |
| 2013/0122803 A1* | 5/2013 | Forster | H04B 7/155 |
| | | | 455/11.1 |
| 2014/0060552 A1 | 3/2014 | Cohen | |
| 2014/0378790 A1 | 12/2014 | Cohen | |
| 2015/0088307 A1 | 3/2015 | Ackerman | |
| 2015/0363861 A1* | 12/2015 | Capel | G06Q 30/0631 |
| | | | 705/26.7 |
| 2018/0043114 A1 | 2/2018 | Bowen et al. | |
| 2018/0374127 A1 | 12/2018 | Walden et al. | |
| 2019/0020641 A1 | 1/2019 | Wasily et al. | |
| 2019/0036688 A1 | 1/2019 | Wasily et al. | |
| 2019/0158938 A1 | 5/2019 | Bowen et al. | |
| 2019/0314705 A1* | 10/2019 | Hansen | G06K 7/10356 |
| 2020/0345078 A1 | 11/2020 | Greenbaum | |
| 2021/0007414 A1 | 1/2021 | Greenbaum | |
| 2022/0030380 A1 | 1/2022 | Sipes | |

OTHER PUBLICATIONS

U.S. Appl. No. 17/234,733, Notice of Allowance, dated Nov. 1, 2021.
U.S. Appl. No. 15/234,733, Nonfinal Office Action, dated Jul. 13, 2021.
U.S. Appl. No. 17/223,237, Notice of Allowance, dated Sep. 15, 2021.
U.S. Appl. No. 17/223,179, Notice of Allowance, dated Jun. 29, 2021.
U.S. Appl. No. 17/223,237, Nonfinal Office Action, dated Jun. 14, 2021.
U.S. Appl. No. 17/223,179, Nonfinal Office Action, dated Jun. 11, 2021.
U.S. Appl. No. 17/065,825, Notice of Allowance, dated Mar. 10, 2021.
U.S. Appl. No. 17/065,825, Nonfinal Office Action, dated Nov. 24, 2020.
International Application No. PCT/US2021/053690, International Search Report and Written Opinion, mailed Feb. 4, 2022.

* cited by examiner

SYSTEMS AND METHODS OF WIRELESS COMMUNICATION FOR INVENTORY MANAGEMENT

CROSS-REFERENCE TO RELATED APPLICATIONS

This application is a continuation of U.S. patent application Ser. No. 17/548,846 filed Dec. 13, 2021, which is a continuation of U.S. patent application Ser. No. 17/234,733 filed Apr. 19, 2021 (issued as U.S. Pat. No. 11,200,535), which is a continuation-in-part of U.S. patent application Ser. No. 17/065,825 filed Oct. 8, 2020 (issued as U.S. Pat. No. 10,984,380), which are hereby expressly incorporated by reference herein.

FIELD OF THE DISCLOSURE

The present patent relates generally to systems, devices, and processes for monitoring inventory of electronic devices having wireless communication capabilities (particularly vaporization devices) and/or other non-communicating inventory having wireless tags incorporated into or attached to such non-communicating inventory (particularly packaged vaporization cartridges).

BACKGROUND

Vaporization devices are generally well known in the art. Such devices are typically battery-powered and are often used as smoking substitutes, to simulate smoking or as a smoking sensation aid. Vaporization devices typically include a battery, a heating element and a cartridge that contains a storage container that houses a vapor forming medium. The vapor forming medium often includes a liquid suspension containing nicotine, or one of many other vaporizable substances commonly employed in the art. In practice, the user draws air through the device via a mouthpiece, which activates the heating element such that the vapor forming medium is heated by the heating element to form the resulting vapor. The vapor may be mixed with the air drawn by the user to form an inhalable aerosol.

Those familiar with the industry may be concerned about use of the vaporization device by an unauthorized user. An unauthorized user may be someone who doesn't own the device, or may be, for example, a minor. Consequently, some vaporization devices have wireless communication capabilities to facilitate device authorization via a wireless connection with a mobile device or other wireless device. Similarly, other types of consumer electronic devices (e.g., wearable computing devices, smart home devices, Internet-of-Things (IoT) devices, or input or output accessory devices) are configured to enable wireless communication with external computing devices, such as smart phones or personal computers. Thus, many vaporization devices and other consumer electronic devices have internal (e.g., rechargeable) batteries and wireless communication components.

Such consumer electronic devices and other inventory are also subject to significant loss through theft or damage prior to sale at retail locations. Current inventory management techniques require significant manual intervention and produce only sporadic verification of inventory location. Even the use of radio-frequency identification (RFID) tags on device packaging is limited by the short range of RFID communication and by the attachment of such tags to packages from which the electronic devices can be removed. Additionally, such RFID tags can be easily damaged or shielded due to their small size and low signal power. Even when operating properly, such RFID tags are typically scanned only upon occurrence of specific events, such as during distribution. Real-time inventory data regarding inventory levels of items within a retail environment is currently unavailable. Although sales data may be compared against inventory shipment data, significant delays are introduced when inventory is sold by third-party retails. Additionally, inventory that is removed without a properly recorded sale (e.g., inventory lost to theft, damage, or misreporting) is only identified by manual inspection. Thus, an opportunity exists for improvements in automatic inventory tracking and management systems.

SUMMARY

The systems, devices, methods, and techniques described herein solve the problem of automatically monitoring and managing inventory at retail locations. To solve this problem, the techniques disclosed herein use either built-in wireless communication capabilities of electronic devices or wireless tags contained within or affixed to non-communicating inventory items to automatically detect current inventory levels. A wireless connection device is configured to communicate with inventory items via transmission and receipt of wireless messages, based upon which the wireless connection device determines current inventory levels within its wireless communication range. Such wireless connection device is further configured to communicate with a remote inventory server via a communication network to provide automatic inventory updates to the inventory server. The disclosure herein generally relates to systems, devices, methods, and non-transitory computer-readable media storing instructions for automatically monitoring inventory via wireless communication.

The techniques described herein may include a method for automatically monitoring inventory, comprising: determining occurrence of a triggering event associated with a triggering condition by a processor of a wireless connection device; transmitting an inventory request message by a wireless communication component of the wireless connection device to one or more wireless tags of corresponding one or more inventory items within a wireless communication range of the wireless connection device; receiving the inventory request message at each of the wireless tags of the one or more inventory items; transmitting a response message from each of the wireless tags to the wireless connection device in response to the inventory request message; receiving the one or more response messages from the respective one or more wireless tags at the wireless communication component of the wireless connection device; generating an inventory message based upon the one or more response messages by the processor of the wireless connection device, wherein the inventory message indicates a level of inventory at a location associated with the wireless connection device and wherein the inventory message is distinct from each of the one or more responses messages; sending the inventory message based upon the one or more response messages from the wireless connection device to an inventory server via a communication network; receiving the inventory message at the inventory server from the wireless connection device via the communication network; and/or determining current inventory at the location associated with the wireless connection device by one or more processors of the inventory server based upon the inventory message.

The inventory message from the wireless connection device may include an indication of both a number of the one or more inventory items and a type of the one or more inventory items. To facilitate determination of inventory types, each of the one or more response messages may include a plurality of bits comprising a stock keeping unit (SKU) or Electronic Product Code (EPC) identifying the type of the respective inventory item. Thus, the inventory message may include data indicating the number of each of a plurality of types of inventory at the location, as applicable. In some embodiments, the wireless tags may comprise radio frequency identification (RFID) tags disposed within or affixed to packaging of each respective inventory item. Such RFID wireless tags may be passive or active tags, including tags with internal batteries or with environmental energy harvesting components. Alternatively, the wireless tags may comprise Bluetooth Low Energy (BLE) communication tags disposed within or affixed to packaging of the respective inventory item. In some such embodiments, the BLE wireless tags may include environmental energy harvesting components and/or internal batteries to power communication.

In various embodiments, the wireless connection device may comprise a special-purpose computing device, a general purpose computing device disposed at a fixed location and running a communication application associated with the inventory server, or a mobile computing device running a communication application associated with the inventory server that temporarily comes within a wireless communication range of the inventory. In some embodiments, the wireless connection device may be disposed within a merchandising display configured to display a plurality of electronic devices and/or non-communicating inventory items having wireless tags. In further embodiments, the wireless connection device may be configured to determine its location and include an indication of such location in the inventory message to the inventory server. The wireless connection device may determine when to send an inventory request message based upon various triggering conditions. Such triggering conditions may be based upon time intervals (e.g., to facilitate periodic inventory updates during relevant hours, such as during retail location hours of operation), geographic location (e.g., to facilitate inventory updates when a mobile wireless connection device is determined to be at a geospatial location within a set of geospatial locations associated with retail locations), or other criteria (e.g., in response to a signal from a transmitting beacon at a retail location near the inventory).

In some embodiments, one or more electronic devices having built-in wireless communication capability may intermediate the communication between the wireless connection device and the wireless tags. For example, a wirelessly communicating vaporization device may be configured to communicate with both the wireless tags and the wireless connection device, thus providing an indication of inventory (e.g., a count of wireless tag responses) to the wireless connection device.

To manage inventory, the inventory server may determine total inventory or one or more types of inventory items at one or more locations based at least in part upon the inventory message. The inventory server may then generate an inventory distribution plan to provide adequate inventory to the one or more locations based at least in part upon the total inventory determined at the one or more locations. The inventory server may further cause distribution of inventory according to the inventory distribution plan, such as by shipping additional inventory to one or more locations.

Systems or computer-readable media storing instructions for implementing all or part of the methods described above may also be provided in some aspects. Such systems or computer-readable media may include executable instructions to cause one or more processors to implement part or all of the methods described above. Additional or alternative features described herein below may be included in some aspects.

BRIEF DESCRIPTION OF THE DRAWINGS

The figures described below depict various aspects of the systems and methods disclosed herein. Advantages will become more apparent to those skilled in the art from the following description of the embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive. Further, wherever possible, the following description refers to the reference numerals included in the following figures, in which features depicted in multiple figures are designated with consistent reference numerals.

DETAILED DESCRIPTION

The systems, devices, methods, and techniques described herein solve the problem of automatically monitoring and managing inventory in a retail environment. Such inventory may include electronic devices having wireless communication capabilities, such as vaporization devices. Such inventory may additionally or alternatively include non-communicating inventory items, such as packages of replaceable cartridges containing a vaporizable substance. To solve the problem of automatically monitoring inventory, the techniques disclosed herein use wireless communication with the inventory items, either via the built-in wireless communication capabilities of the electronic devices or via wireless tags included within or affixed to packaging of non-communicating inventory items. To communicate with a remote inventory server via a communication network, wireless connection devices are configured to communicate wirelessly with the inventory items and to separately communicate with the inventory server. Such wireless connection devices determine local inventory levels based upon wireless responses from inventory items, which inventory levels are then communicated in inventory messages to the inventory server. Thus, the inventory levels within a wireless communication range of the wireless connection device may be monitored automatically and, in some embodiments, substantially in real time through periodic communication. Unlike existing techniques, inventory levels are automatically determined through wireless communication using the built-in or added wireless communication components in inventory items while such items are in inventory prior to sale to a customer. Additional, fewer, or alternative aspects may be included in various embodiments, as described herein.

Figure 1:
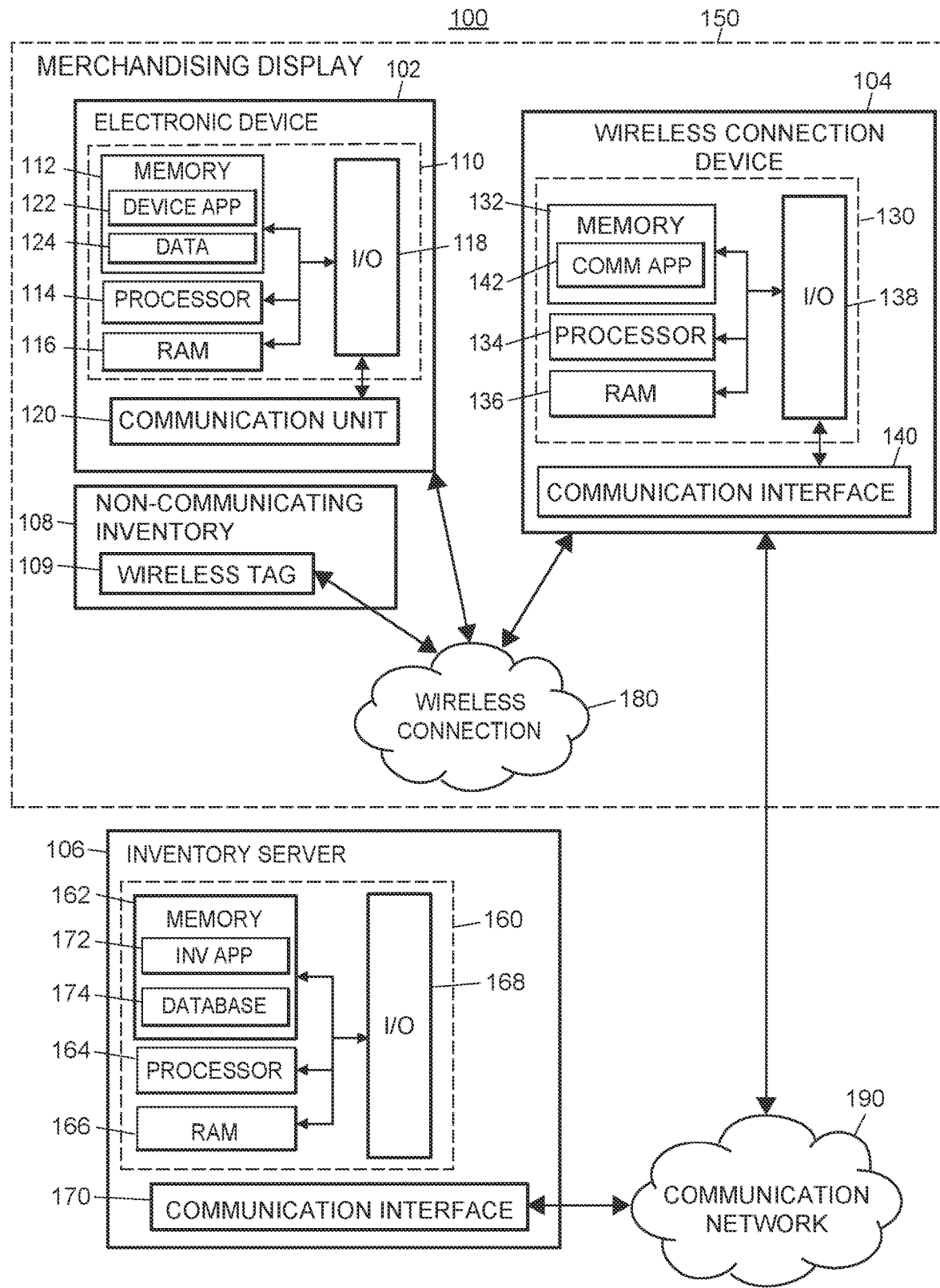
FIG. 1 illustrates a block diagram of an exemplary inventory management system using wireless communication with inventory items.

FIG. 1 illustrates a block diagram of an exemplary inventory management system 100, comprising an electronic device 102, a non-communicating inventory item 108, a wireless connection device 104, and an inventory server 106. The electronic device 102 and the non-communicating inventory item 108 are each communicatively connected to the wireless connection device 104 via a wireless connection 180, and the wireless connection device 104 is communicatively connected to the inventory server 106 via a communication network 190. Thus, the electronic device 102 and the non-communicating inventory item 108 are indirectly wirelessly connected to the inventory server 106 via the wireless connection device 104. The inventory management system 100 provides an example of an environment in which the techniques described herein may be implemented to provide inventory tracking, monitoring, and management. Additional, fewer, or alternative components or configurations may be implemented in various embodiments.

Although only one of each of the electronic device 102, non-communicating inventory item 108, wireless connection device 104, and inventory server 106 is illustrated for simplicity, alternative embodiments may include multiple such components. In some embodiments, a plurality of electronic devices 102 or non-communicating inventory items 108 communicate via corresponding wireless connections 180 with a single wireless connection device 104 at a retail location. Similarly, although illustrated as one wireless connection 180, separate wireless connections 180 are used for each electronic device 102 and non-communicating inventory item 108 (or for each of a plurality of groups of inventory items) in some embodiments. In further embodiments, a plurality of wireless connection devices 104 communicate via one or more communication networks 190 with one or more inventory servers 106. Thus, a plurality of electronic devices 102 or non-communicating inventory items 108 at a plurality of retail locations associated with respective wireless connection devices 104 may communicate with a single inventory server 106. In some embodiments, a wireless connection device 104 is disposed within a merchandising display 150 to communicate with one or more electronic devices 102 and one or more non-communicating inventory items 108 stored in the merchandising display 150. Such merchandising display 150 may be a shelf display, a floor display, or another type of fixed or movable display for presenting a plurality of inventory items (i.e., electronic devices 102 and/or non-communicating inventory items 108) to consumers in a retail environment. The merchandising display 150 may further provide an electrical power connection to a power outlet in order to power the wireless connection device 104. Because the wireless connection device 104 communicates with any electronic devices 102 and any non-communicating inventory items 108 in the display via wireless connections 180, a merchandising display 150 may be used at various times to display a plurality of combinations of types of electronic devices 102 and/or non-communicating inventory items 108, without requiring modification or reconfiguration.

The electronic device 102 is a consumer electronic device having at least basic computing and wireless communication capabilities. Although only one electronic device 102 is illustrated, a plurality of electronic devices 102 (of the same type or of multiple types) may be part of various embodiments of the inventory management system 100. As noted elsewhere herein, the electronic device 102 may be a vaporization device configured to communicate wirelessly with an external device for authorization or activation. In further embodiments, the electronic device 102 may include any type of wirelessly connected device, such as a wearable computing device, a smartphone, a workstation computer, a tablet computer, a smart device (e.g., a smart speaker, a personal digital assistant device, or an Internet-of-Things (IoT) connected device or component), a wireless accessory device, or other type of computing device capable of receiving and processing electronic information through wireless communication connection. In some embodiments, the electronic device 102 may comprise a mobile computing device (such as a smartphone) that is capable of communicating indirectly with the inventory server 106 via a wireless connection to the communication network 190.

Regardless of its type, the electronic device 102 includes a controller 110 to receive, store, process, generate, and output data. The controller 110 includes a memory 112 storing processor-executable instructions in a non-transitory medium, one or more processors 114 configured to execute computer-readable instructions, a random access memory (RAM) 116 for temporary memory, and an input/output (I/O) circuit 118. The components of the controller 110 may be interconnected via an address/data bus or other means. It should be appreciated that although only one processor 114 is depicted, the controller 110 may include multiple processors 114 in some embodiments. Similarly, the controller 110 may include multiple RAMs 116 and multiple memories 112. Although the I/O circuit 118 is likewise depicted as a single block, the I/O circuit 118 may include a number of different I/O circuits, which may be configured for specific I/O operations. The processor 114 may include one or more processors of any known or hereafter developed type, including general-purpose processors or special-purpose processors. Similarly, the controller 110 may implement the RAM 116 and memory 112 as semiconductor memories, magnetically readable memories, optically readable memories, or any other type of memory.

To implement functionality of the inventory management system 100, the memory 112 of the electronic device 102 may store various applications, routines, software modules, and data. Thus, memory 112 includes a device application 122 configured to manage communication regarding inventory information of the electronic device 102, as described in further detail below. Such device application 122 may be configured to establish a wireless connection 180 with and to communicate with the wireless connection device 104, as well as to access or update data 124 stored in the memory 112. Such data 124 may include a device identifier, along with other device information, specifications, location, status, battery level, communication parameters, or other relevant information used by the electronic device 102.

To provide wireless connectivity with the wireless connection device 104, the electronic device 102 further includes a communication unit 120 capable of sending and receiving data via the wireless connection 180. The communication unit 120 may include hardware and software components (e.g., encoding modules, decoding modules, and antennas) to transmit messages based up data received from the controller 110 or to provide received messages to the controller 110. The communication unit 120 may transmit and receive wireless communications with one or more wireless connection devices 104 via the respective wireless connections 180, using any suitable wireless communication protocols, such as Bluetooth Low Energy (BLE) communications, Wi-Fi network communications (802.11 standards), wireless telephony network communications (e.g., GSM, CDMA, LTE, 5G, etc.), etc. In some embodiments, one or more communication units 120 may be included within an electronic device 102 to handle multiple types of wireless communications. Furthermore, the communication unit 120 may provide input signals to the controller 110 via the I/O circuit 118. The controller 110 of the electronic device 102 may further be configured to communicate data through the communication unit 120 using any suitable data protocol.

The non-communicating inventory item 108 may be any other type of inventory item that has a wireless tag 109 included within or affixed to the item itself or to packaging of the item. Such non-communication inventory times 108 may include items in inventory that either do not include processing and wireless communication capabilities as described above with respect to the electronic device 102 (e.g., packages of vaporization cartridges for use with a communicating vaporization device) or are not configured to communicate with the wireless connection device 104 despite having such processing and wireless communication capabilities. Many types of non-communicating inventory items 108 are contemplated by the present disclosure, including inventory configured for use with the electronic device 102 (e.g., cartridges, device-specific accessories, or device-specific chargers or cables) and other inventory not specifically configured for use with the electronic device 102 (e.g., packs of standard batteries, standard electrical chargers or cables, or unrelated products). Regardless of the type of inventory, the non-communication inventory item 108 includes a wireless tag 109 configured to communicate with the wireless connection device 104 via the wireless connection 180.

The wireless tag 109 comprises a component added to the inventory item 108 during manufacturing, packaging, or distribution. In some embodiments, the wireless tag 109 comprises a radio frequency identification (RFID) tag of a type generally known in the art, which may be either an active RFID tag with a power source or a passive RFID tag that draws power from an interrogation message sent from an RFID reader (e.g., from the wireless connection device 104 performing tag interrogation). In further embodiments, the wireless tag 109 comprises a Bluetooth Low Energy (BLE) communication tag configured to communicate with wireless connection devices 104 via BLE wireless communication protocols. In some such embodiments, the BLE wireless tag 109 comprises a Bluetooth beacon operating in a broadcast-only mode in order to reduce cost and complexity. In some embodiments, a wireless tag 109 includes one or more of a battery or an environmental energy harvesting component (not shown) to provide power for improved communication by an RFID or BLE transceiver of the wireless tag 109. Such batteries and environmental energy harvesting components may include any such components known in the art.

The wireless tag 109 may be disposed within or affixed to a packaging (not shown) of the non-communicating inventory item 108, or it may be disposed within or affixed to the non-communicating inventory item 108 itself. In some embodiments, the wireless tag 109 is disposed within or affixed to packaging of the non-communicating inventory item 108 in order to avoid adding to the weight or size of the inventory item itself when removed from the packaging for use by a purchaser. In some such embodiments, the wireless tag 109 is affixed to the non-communicating inventory item 108 in a manner enabling the wireless tag 109 to be removed without damage to the item of to the packaging, such as by a means requiring a special key or tool to remove the wireless tag 109 upon purchase of the non-communicating inventory item 108 by a customer. In other embodiments, the wireless tag 109 may be disposed within or affixed directly to the inventory item 108, such that the wireless tag 109 remains with the inventory item when removed from any packaging, which may be appropriate for inventory without separate packaging.

Selection of a particular type of wireless tag 109 and its manner of attachment to the non-communicating inventory item 108 will depend upon various factors, including physical size of the inventory, cost or value of the inventory, risk of theft of the inventory, expected shipping and distribution time, and expected shelf life of the inventory between being displayed at a retail location and being purchased or otherwise removed from the merchandising display 150. For example, BLE wireless tags 109 provide greater flexibility in communication with the wireless connection device 104 over a greater distance, but they also have greater power consumption and higher cost due to their greater complexity. Thus, the tradeoff between signal range and both power requirements and cost must be considered when selecting a wireless tag 109.

The wireless connection device 104 comprises computing components configured to manage communication of information between the electronic device 102 or the non-communicating inventory item 108 and the inventory server 106. Thus, the wireless connection device 104 comprises a computing device configured to communicate wirelessly with communication units 120 of electronic devices 102 or wireless tags 109 of non-communicating inventory items 108 via wireless connections 180, as well as with an inventory server 106 via the communication network 190. The wireless connection device 104 is therefore also further configured to receive, store, process, generate, access, and output data. In some embodiments, the wireless connection device 104 is a special-purpose computing device configured specifically for communication and data processing as part of the inventory management system 100. In alternative embodiments, the wireless connection device 104 may be a general-purpose computing device configured for general network access and routing purposes (e.g., a wireless router or radio access network station). For example, the wireless connection device 104 may comprise a wireless router or gateway connected to a wired communication network using Wi-Fi network protocols.

In some embodiment, the wireless connection device 104 may be disposed in a known location (e.g., at a retail location), such that inventory server 106 identifies the location based upon an identifier of the wireless connection device 104. In another embodiment, the wireless connection device 104 may move between locations. In some such embodiments, the wireless connection device 104 comprises a mobile computing device (e.g., a smartphone) of a device user. Such mobile computing device may be brought temporarily within wireless communication range of one or more electronic devices 102 or non-communicating inventory items 108 in inventory at a retail location, thereby facilitating communication with such inventory. Thus, inventory information may be provided for a location at a plurality of times by a plurality of mobile computing devices serving as wireless connection devices 104 according to instructions of a communication application 142 (discussed below). In such embodiments, the wireless connection device 104 may determine and provide an indication of its location to the inventory server 106 along with information regarding electronic devices 102 or non-communicating inventory items 108 at the location.

Like the electronic device 102, the wireless connection device 104 includes a controller 130 that stores and processes electronic data and a communication interface 140 that communicates with external computing devices (e.g., electronic devices 102 and non-communicating inventory items 108 via wireless connections 180 and the inventory server 106 via the communication network 190). Similar to the controller 110, the controller 130 receives, processes, produces, transmits, and stores data. The controller 130 includes a memory 132, a processor 134, a RAM 136, and an I/O circuit 138, each configured and operating analogously to the corresponding components of the controller 110 described above. The wireless connection device 104 also includes a communication interface 140 configured to send and receive communications between the wireless connection device 104 and external computing devices or other communicating components via wireless connections 180 or the communication network 190. Similar to the communication unit 120, the communication interface 140 may include software and hardware components configured to enable communication using standard or specialized communication protocols, via wired or wireless communication connections. The communication interface 140 may be configured to communicate with inventory items via a single type of wireless connection 180 or via multiple types of wireless connections 180. In some embodiments, the communication interface 140 comprises an RFID transceiver configured to communicate with RFID tags by sending an interrogation signal and receiving one or more response signals from wireless tags 109, from which a count of inventory may be generated. In further embodiments, the communication interface 140 comprises a BLE transceiver configured to communicate with BLE tags or other BLE-enabled devices by establishing a communication connection with a communication unit 120 or wireless tag 109, from which inventory levels or other inventory information may be determined.

To implement functionality of the inventory management system 100, the memory 132 of the wireless connection device 104 may store various applications, routines, software modules, and data. Thus, memory 132 includes a communication application 142 in order to obtain or receive status data from electronic devices 102 or non-communicating inventory items 108 within wireless communication range of the wireless connection device 104 and to send corresponding inventory data to the inventory server 106. The communication application 142 may perform further functions as discussed below, such as establishing communication connections, obtaining a device location, sending inventory request messages, receiving response and device status messages, generating inventory messages from received messages, sending inventory messages to an inventory server 106, receiving update messages from the inventory server 106, or sending update messages to electronic devices 102. In some embodiments, the communication application 142 may be installed on a mobile computing device that changes location, in which case the communication application 142 may further advertise its presence to electronic devices 102 or non-communicating inventory items 108 within range to establish wireless connections 180.

The inventory server 106 comprises computing components configured to monitor inventory levels of a plurality of inventory items (i.e., electronic devices 102, non-communicating inventory items 108, or combinations thereof) at a plurality of locations associated with wireless connection devices 104. Thus, the inventory server 106 comprises one or more servers configured to communicate via the communication network 190, as well as to receive, store, process, generate, access, and output data. Like the wireless connection device 104, the resource server includes a controller 160 that stores and processes electronic data and a communication interface 170 that communicates with external computing devices (e.g., wireless connection devices 104) via the communication network 190. Similar to the controller 130, the controller 160 receives, processes, produces, transmits, and stores data. The controller 160 includes a memory 162, a processor 164, a RAM 166, and an I/O circuit 168, each configured and operating analogously to the corresponding components of the controller 130 described above. The inventory server 106 also includes a communication interface 170 configured to send and receive communications between the inventory server 106 and external computing devices via a data network connection with the communication network 190. Similar to the communication interface 140, the communication interface 170 may include software and hardware components configured to enable communication using standard or specialized communication protocols, via wired or wireless communication connections.

The memory 162 of the inventory server 106 may store various applications, routines, software modules, and data for inventory tracking and management. Thus, the memory 162 may store an inventory application 172 to obtain inventory information regarding a plurality of inventory items from wireless connection devices 104. The inventory application 172 may access, edit, update, remove, and generate inventory data in a database 174 stored in the memory 162 (or stored in another memory communicatively connected to the controller 160). The database 174 may store data regarding current or past statuses of electronic devices 102, inventory levels of various types of communicating and non-communicating inventory items at retail locations associated with wireless connection devices 104, past inventory level changes, or other information relating to inventory monitoring and management. The inventory application 172 may use such inventory data to determine whether an inventory distribution is needed to resupply retail locations with additional inventory. In some embodiments, the inventory data may be used by the inventory application 172 to identify updates to electronic devices 102, then send update messages to respective wireless connection devices 104 to implement such updates.

Figure 2:
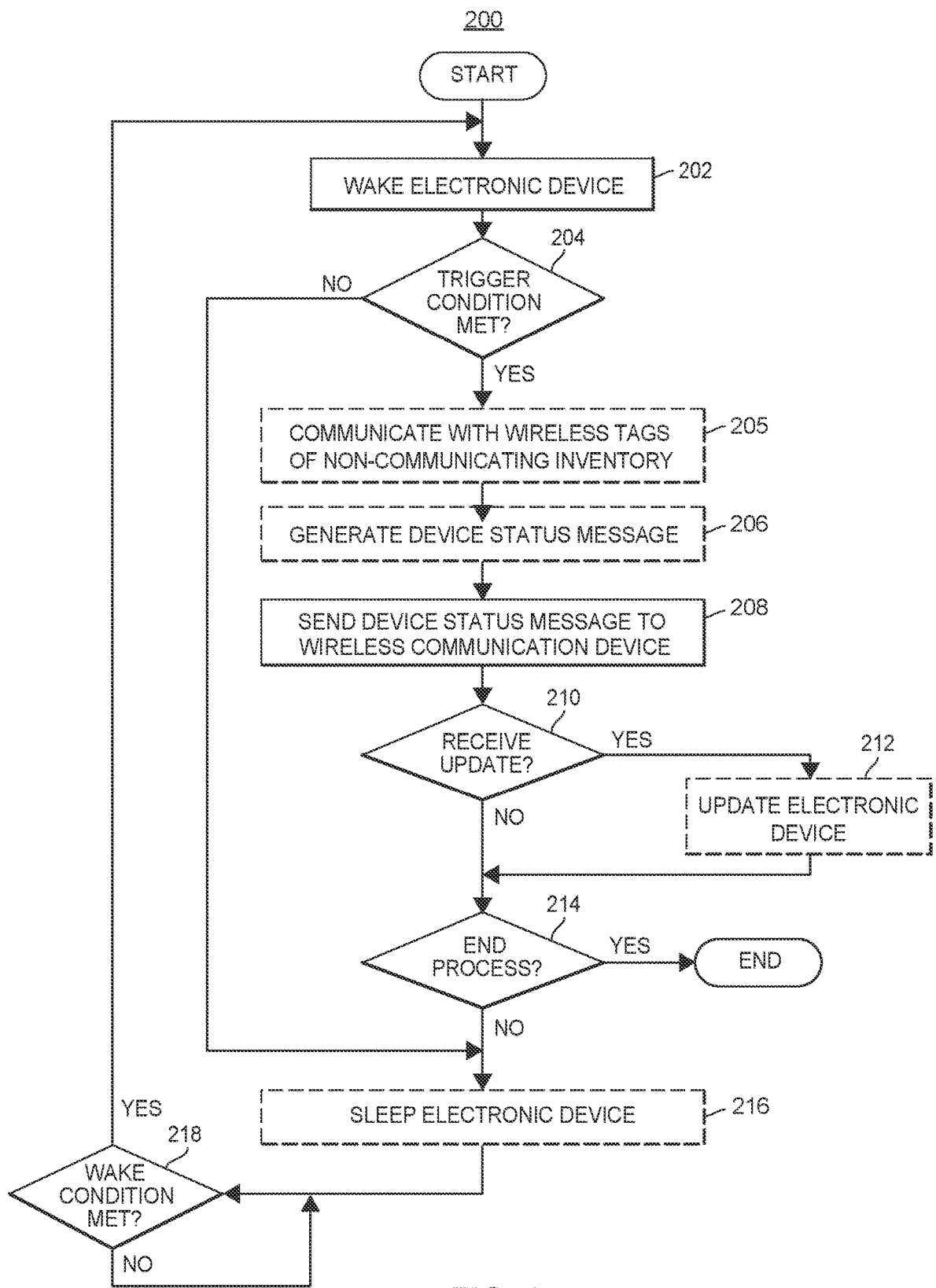
FIG. 2 illustrates a flow diagram of an exemplary device status reporting method implemented by an electronic device, according to certain embodiments.

FIG. 2 illustrates a flow diagram of an exemplary device status reporting method 200 implemented by an electronic device 102 to facilitate inventory monitoring and management. The electronic device 102 (e.g., a vaporization device having wireless communication capabilities) may implement the method 200 to provide device status information to an inventory server 106 by a wireless connection 180 with a wireless connection device 104. Various aspects of the method 200 may be performed by software applications, routines, or modules running on the electronic device 102, such as the device application 122.

The device status reporting method 200 begins with the electronic device 102 waking from a low-power sleep mode (block 202). If a trigger condition is not met, the electronic device 102 may return to the low-power sleep mode (block 216). When a trigger condition is met (block 204), a device status message may be generated (block 206). In some embodiments, the electronic device 102 may first communicate with any wireless tags 109 within its wireless communication range (block 205) to detect corresponding non-communicating inventory items 108, which information may then be included in the device status message (block 206). After generating or retrieving from memory 112 the device status message, the electronic device 102 sends the device status message to the wireless connection device 104 (block 208). If the wireless connection device 104 returns an update message to the electronic device 102 (block 210), the electronic device 102 updates data stored in the memory 112 (block 212) before proceeding. Next, the electronic device 102 determines whether to end the method 200 (e.g., when the device has been registered as no longer being in inventory) (block 214). If the method 200 does not end, the electronic device 102 may return to the low-power sleep mode (block 216). The electronic device 102 then remains in the low-power sleep mode until a wake condition has been met (block 218), at which point the electronic device 102 wakes (block 202). Additional or alternative aspects may be included in some embodiments.

At block 202, the electronic device 102 wakes from the low-power sleep mode to a high-power awake mode. The low-power sleep mode may be used to conserver battery life while the electronic device 102 is in inventory at a retail location, as well as in transit to the retail location. Thus, the electronic device 102 may be controlled to wake only at long intervals (e.g., hourly or daily). Additionally, the high-power awake mode may further limit battery drain by enabling only those features and components needed for the device status reporting method 200, such as by keeping displays from turning on or preventing other software applications from running.

At block 204, the electronic device 102 determines whether a trigger condition has been met for sending a device status message. The trigger condition may comprise detection of occurrence of an event, and the trigger condition may comprise a combination of multiple criteria. In some embodiments, the trigger condition may be adjustable based upon data 124 stored in the memory 112 in order to facilitate different trigger conditions based upon a location or status of the electronic device (e.g., based upon a battery level of the device or whether the device is at a known retail location) in order to conserve power. Such trigger condition may comprise a time interval such as a duration since a previous device status message having exceeding a predetermined threshold (e.g., a number of minutes or hours or a number of wake cycles). In some embodiments, the trigger condition includes establishing a wireless connection 180 between the electronic device 102 and a wireless connection device 104. In such embodiments, the electronic device 102 may attempt to establish a wireless connection 180 with a wireless connection device 104 within wireless communication range upon the device waking, then determine the trigger condition to be met (in whole or part) upon successfully establishing the wireless connection 180. In further embodiments, the trigger condition may be determined to be met when the electronic device 102 receives an inventory request message from a wireless connection device 104 while the electronic device 102 is awake. If the trigger condition is determined to have been met, the electronic device 102 proceeds to send a device status message in response to the occurrence of the corresponding trigger event. Otherwise, the electronic device 102 returns to the low-power sleep mode at block 216.

At block 205, in some embodiments, the electronic device 102 may communicate with one or more wireless tags 109 of corresponding non-communicating inventory items 108 within a wireless communication range of the electronic device 102. Such communication occurs via wireless connections 180 between the communication unit 120 and the wireless tags 109, which may be transitory connections (e.g., broadcast transmissions) or persistent connections (e.g., directed connections between identified pairs of communicating devices). In some embodiments, the communication unit 120 of the electronic device 102 transmits an inventory request message (e.g., broadcasting an RFID interrogation signal or a BLE advertising packet or scan request) to any nearby communication components. In response to such inventory request message, each wireless tag 109 receiving such inventory request message returns a response message (e.g., an RFID response or backscatter signal or a BLE connection response or scan response) to the communication unit 120. In some such embodiments, the electronic device 102 and each wireless tag 109 may establish communication connections (e.g., by registration of RFID tags or establishing BLE connections) before exchanging further inventory-related information (e.g., SKUs, EPCs, or other identifying codes). In further embodiments, the electronic device 102 determines the number and type of non-communicating inventory items 108 based upon the response messages.

At block 206, in some embodiments, the electronic device 102 generates a device status message containing device status information regarding the current status of the electronic device 102. The device status message may include an identifier of the electronic device, which may specifically identify the particular electronic device 102 or may identify a type of the electronic device 102. For example, a unit serial number may be used as the identifier. Additionally, in some embodiments, the device status message may include additional device status data regarding a current status of the electronic device 102. Such device status data may include a battery level, a software version, a time of a last update, a location, a device operating status check report, or other device status information regarding the particular electronic device 102. Alternatively, the electronic device 102 may simply retrieve a device status message containing predefined data (e.g., the identifier of the device) from the memory 112 to send to the wireless connection device 104. In embodiments in which the electronic device 102 has communicated with one or more wireless tags 109 at block 205, however, the electronic device 102 also generates the device status message by including an indication of the number and type of non-communicating inventory items 108 based upon the received response messages from the corresponding one or more wireless tags 109. In some such embodiments, the device status message is generated to include portions of each response message received from the wireless tags 109 (e.g., as SKU or EPC received in a response).

At block 208, the electronic device 102 sends a device status message to the wireless connection device 104 via the wireless connection 180. The device status message may be a message generated by the electronic device 102 or a predefined message stored in the memory 112 of the electronic device 102. In some embodiments, the electronic device 102 sends the device status message using a reliable wireless communication protocol, such as the Transmission Control Protocol (TCP), in order to determine whether the device status message is received by the wireless connection device 104. In alternative embodiments, the electronic device 102 sends the device status message using a connectionless protocol, such as the User Datagram Protocol (UDP), in order to conserve power at the expense of confirming the device status message is received. In either case, the controller 110 of the electronic device 102 controls the communication unit 120 to transmit wirelessly the device status message to a wireless connection device 104 within a wireless communication range of the electronic device 102. In response to such device status message, the wireless connection device 104 may then send a related inventory message to the inventory server 106, as discussed further below.

At block 210, the electronic device 102 determines whether a response containing an update has been received within a response interval from the wireless connection device 104. The response interval may be set to a time duration sufficient to allow for a response from the wireless connection device 104 in order to avoid remaining in the power-consuming awake mode in the event of communication disruption. If a response is received from the wireless connection device 104 that does not include an update or if no response is received within the response interval, the method 200 proceeds to determine whether to end at block 214. If a response including an update is received from the wireless connection device 104, the method first proceeds to update the information stored in the memory 112 at block 212.

At block 212, the electronic device 102 performs an update of information stored in its memory 112 based upon the update received in the response from the wireless connection device 104. Performing such update may include updating data 124 stored in the memory 112 for use by software running on the electronic device 102. Performing the update may additionally or alternatively include updating software stored in the memory 112, which may include the device application 122. By updating the information in the memory 112 (either application data or software) while the electronic device 102 is in inventory at a retail location, this technique may improve functionality upon initial operation of the electronic device 102 by a purchaser, thereby eliminating or reducing the time spent updating the electronic device 102 after purchase. In some embodiments, an update may occur when a device has been removed from inventory, such as by purchase or registration by a purchaser. In such instances, the update may comprise an update to a variable or parameter stored in the data 124 to cause the controller 110 to end the device status reporting method 200. In further embodiments, an update may include an adjustment to a variable or parameter indicating a frequency of sending device status messages or a wake condition associated with waking the electronic device 102, which may be updated to conserve power in a battery of the electronic device 102.

In some embodiments, an update may improve performance of the electronic device 102 or provide additional functionality of software installed on the electronic device 102. In further embodiments, an update may restrict or limit operation of the electronic device 102, which limitations may be based upon regulatory or other requirements applicable to a location of the electronic device. Thus, the update process may ensure the electronic device 102 complies with jurisdiction-specific requirements after the device has been shipped to a retail location, even in cases of such requirements being implemented after the electronic device 102 has been shipped to the retail location or in cases of electronic devices 102 arriving at unintended retail locations. Although useful for any type of electronic devices 102, such location-specific updating capabilities may be particularly advantageous for heavily regulated electronic device 102, such as vaporization devices. In some embodiments, the electronic device 102 may first determine a battery level is sufficient to perform the update prior to updating the information in the memory 112 in order to avoid excessive battery drain or power depletion prior to completion of the update process.

At block 214, the electronic device 102 determines whether to end the device status reporting method 200 based upon the data 124 stored in the memory 112 of the electronic device 102. Such data 124 may include data updated at block 212. In some embodiments, the data 124 causing the method 200 to end may indicate a battery level of the electronic device 102 below a minimum threshold level, thereby necessitating power conservation. Unless the data 124 indicate the method 200 should be ended, the method 200 continues with the electronic device 102 placing itself in the low-power sleep mode.

At block 216, the electronic device 102 returns itself to a low-power sleep mode to conserve power until the next wake event. Placing the electronic device 102 into the low-power sleep mode may include disabling or suspending various operations and functionalities of the electronic device. The electronic device 102 then remains in the low-power sleep mode until it determines at block 218 that a wake condition has been met. Such wake condition may include passage of a predetermined time interval, as indicated by an internal clock of the electronic device 102. In some embodiments, the wake condition may include a combination of required criteria, meeting one or more of which may place the electronic device 102 into a partially awake mode to determine whether the remaining criteria are met. When the wake condition is met, the electronic device 102 returns to the high-power awake mode at block 202 and continues the device status reporting method 200, as discussed above.

Figure 3A:
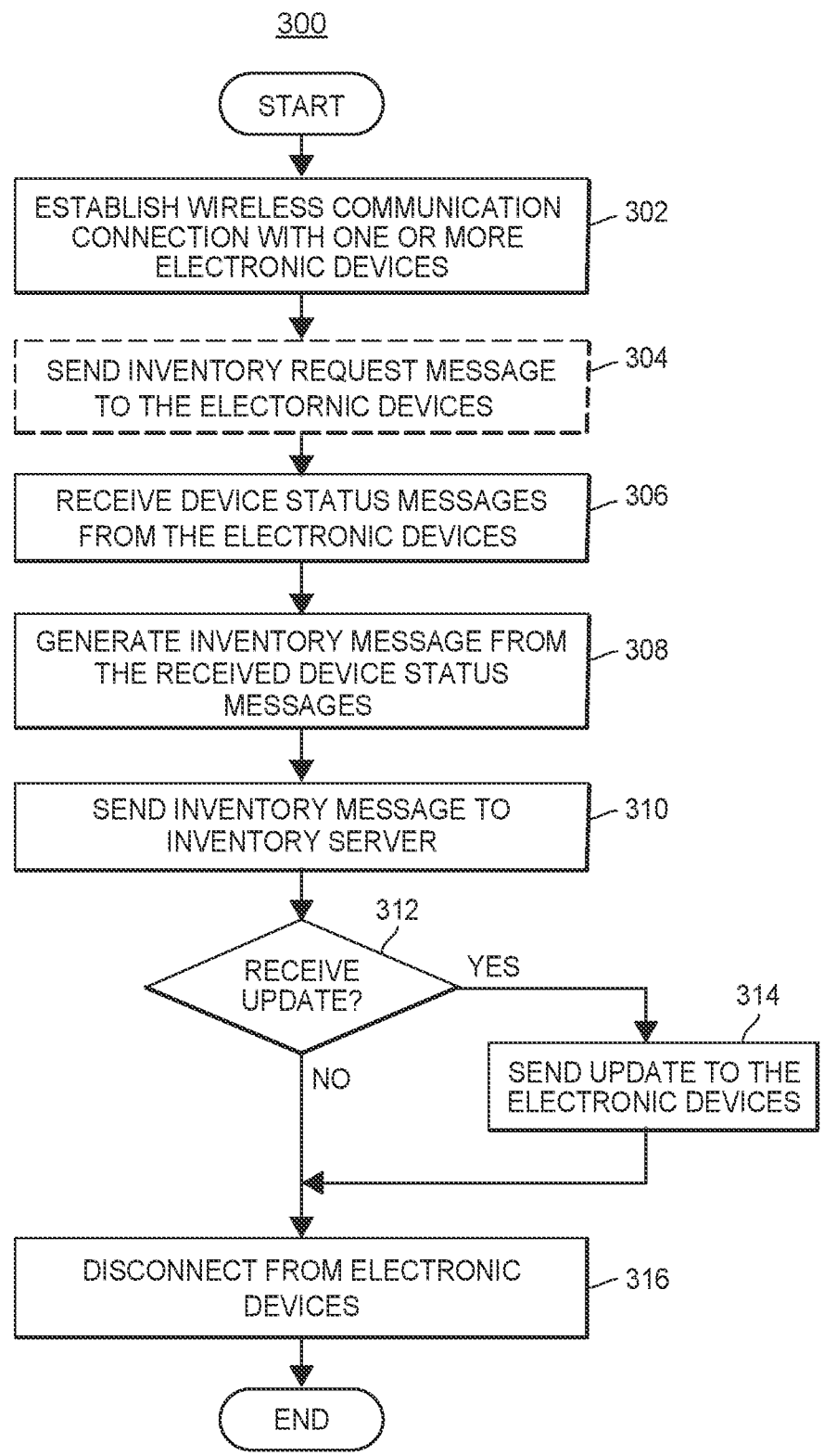
FIGS. 3A-B illustrate flow diagrams of exemplary inventory reporting methods implemented by a wireless connection device, according to certain embodiments.

FIG. 3A illustrates a flow diagram of an exemplary inventory reporting method 300 implemented by a wireless connection device 104 to facilitate inventory monitoring and management. The wireless connection device (e.g., a mobile computing device or other connection component) may implement the method 300 to obtain device status information from one or more electronic devices 102 by respective wireless connections 180 and send inventory information to an inventory server 106. Various aspects of the method 300 may be performed by software applications, routines, or modules running on the wireless connection device 104, such as the communication application 142. The method 300 may be implemented periodically or upon occurrence of trigger events (e.g., location of a mobile computing device at a retail location known to the communication application 142 to be associated with an inventory of relevant electronic devices 102).

The inventory reporting method 300 begins with establishing wireless connections 180 with one or more electronic device 102 (block 302). In some embodiments, the wireless connection device 104 may send an inventory request message to the electronic devices 102 (block 304) to cause them to respond with device status information. Upon receiving device status messages from the one or more electronic devices 102 (block 306), an inventory message is generated from the device status information received in the device status messages (block 308). The wireless connection device 104 then sends the inventory message to the inventory server 106 (block 310) and waits for a response. If the inventory server 106 returns an update message (block 312), the wireless connection device 104 sends corresponding update messages to the respective one or more electronic devices (block 314). Otherwise, the wireless connection device 104 proceeds to disconnect from the electronic devices 102 (block 316). Additional or alternative aspects may be included in some embodiments.

At block 302, the wireless connection device 104 establishes wireless connections 180 with one or more electronic devices 102. The wireless connections 180 may be established in response to communication from the electronic devices 102 or may be initiated by the wireless connection device 104 searching for electronic devices 102 within a wireless communication range. Although shown as being separate from receiving device status messages, some embodiments may combine establishing wireless connections 180 with the transmission and receipt of the device status messages. When the wireless connections 180 are established prior to receiving the device status messages, in some embodiments, the wireless connection device 104 may establish such wireless connections 180 in response to a trigger event at the wireless connection device 104. Such trigger event may comprise expiration of a time period or receipt of a message from the inventory server 106 to poll the electronic device 102. In some embodiments where the wireless connection device 102 is a mobile computing device, the trigger event may comprise determining the mobile computing device is at a known retail location associated with electronic devices 102. Thus, mobile computing devices not specifically associated with the electronic devices 102 (e.g., consumer smartphones running a background process of a communication application 142 installed by the user to access functionality of related electronic devices sold by the same manufacturer or seller as the electronic devices 102) may be used as wireless connection devices 104 to establish wireless connections 180 opportunistically when such mobile computing devices are near the electronic devices (e.g., are near such electronic devices 102 at a retail location). Such mobile computing devices may periodically attempt to connection with any electronic devices 102 within a wireless communication range, establishing wireless connections 180 whenever possible. In some embodiments in which the wireless communication device 104 is a mobile computing device, the trigger event may comprise receiving a signal broadcast by a beacon disposed within a retail location (e.g., receiving a BLE advertising packet broadcast by a BLE beacon). In further such embodiments, the signal broadcast by the beacon may include sufficient information to indicate the location of the mobile computing device for further inclusion in the inventory message.

At block 304, in some embodiments, the wireless connection device 104 sends one or more inventory request messages to the one or more electronic devices 102 via the wireless connections 180 to cause the electronic device 102 to send device status messages to the wireless connection device 104. Such inventory request messages may be generated by the wireless connection device 104 periodically or upon occurrence of another trigger event, such as receiving a message from the inventory server 106 or successfully establishing a new wireless connection 180 with an electronic device 102. In some embodiments, the inventory request message may include an indication of device status data requested by the wireless connection device 104, which may indicate whether to attempt to communicate with wireless tags 109 of non-communicating inventory items 108.

At block 306, the wireless connection device 104 receives device status messages from the one or more electronic devices 102. The device status messages may be received from the electronic devices 102 as discussed elsewhere herein, either in one time interval or at times determined by each of the electronic devices 102. In some embodiments, the wireless connection device 104 may send a response to each device status message acknowledging receipt of the message. In further embodiments, the wireless connection device 104 may store device status data (including any inventory data) received in the device status messages in the memory 132 for later use or communication, such as by storing device status data over an extended period prior to generating and sending an inventory message to the inventory server 106. Thus, the wireless connection device 104 may conserve power or limit network communication, which may be useful in situations in which the wireless connection device 104 relies on battery power or communicates over a metered network. In some such embodiments, a mobile computing device acting as the wireless connection device 104 may store the device status data until it reaches an unmetered network connection (e.g., a home Wi-Fi network).

At block 308, wireless connection device 104 generates an inventory message based upon the received device status messages. The inventory message comprises inventory information indicating at least an indication of the number of one or more types of inventory items (i.e., one or more types of electronic devices 102 and/or non-communicating inventory items 108), while additional inventory information may be included in some embodiments. For example, the inventory message may indicate current inventory at a location by sending portions of the responses or device status messages received by the wireless connection device 104 (e.g., device identifiers, SKUs, or EPCs) or a summary derived therefrom (e.g., a count of each distinct type of inventory item). In some embodiments, the inventory message combines device status data (or inventory information derived therefrom, which may include inventory information regarding non-communicating inventory items 108) received in device status messages from a plurality of electronic devices 102, which may be received over a time interval. Alternatively, a separate inventory message may be generated in response to each received device status message. In either case, the inventory message includes at least one indicator of an electronic device 102 based upon one or more received device status messages. In further embodiments, the wireless connection device 104 may determine a difference between device status data received in one or more previous device status messages during a prior time interval and the device status data received in one or more device status messages during a subsequent time interval (e.g., device status messages received in response to periodic inventory request messages sent by the wireless connection device 104 at different times). In such embodiments, the wireless connection device 104 may identify one or more electronic devices 102 previously determined to be present at the retail location associated with the wireless connection device 104 as no longer being indicated as present at the retail location based upon current device status messages. In some such embodiments, the wireless connection device 104 may generate the inventory message to provide only changed device status information, such as the presence of an additional electronic device 102 at the retail location or the absence of an electronic device 102 previously at the retail location. The inventory message may thus include one or more identifiers of new or missing electronic devices 102 in order to update the inventory information stored by the inventory server 106.

In various embodiments, the wireless connection device 104 determines its location at a time associated with the inventory message and includes an indication of the location in the inventory message. For example, the wireless connection device 104 may include a Global Positioning System (GPS) unit to determine a GPS location coordinate of the wireless connection device 104. Such location determination is particularly advantageous when the wireless connection device 104 is a mobile computing device running a communication application 142 associated with the inventory server 104, such that the mobile computing device is only temporarily located at the retail location. In some embodiments, however, the wireless connection device 104 need not determine or include an indication of location in the inventory message. For example, the inventory message may include a location identifier received from a BLE beacon, from which the inventory server 106 may determine the location of the wireless connection device 104. In some embodiments, the inventory server 106 may determine the location of the wireless connection device 104 based upon a network address of the wireless connection device 104 or based upon a retail location being previously recorded in device records of a plurality of electronic devices 102 identified in the inventory message.

In some embodiments, the inventory message may be distinct from the one or more device status messages received from the one or more electronic devices. In further embodiments, however, the wireless connection device 104 may comprise a network gateway or access node that routes each device status message received from an electronic device 102 via a wireless connection 180 to the inventory server 106 via the communication network 190 as a separate inventory message, without substantive modification (i.e., without changing the message payload). In such embodiments, the wireless connection device 104 simply operates to connect the electronic device 102 in inventory at a retail location to the communication network 190. For example, a mobile computing device operating as the wireless connection device 104 may route received device status messages to the inventory server 106 as inventory messages without significant processing or substantive modification in order to serve as a connection link.

At block 310, the wireless connection device 104 sends the inventory message to the inventory server 106 via the communication network 190. To send the inventory message, the wireless connection device 104 may first establish a communication connection with the inventory server 106 via the communication network 190. In various embodiments, the wireless connection device 104 may send inventory messages as they are generated, or the wireless connection device 104 may send inventory messages in batches, depending upon the network conditions. The wireless connection device 104 will typically receive a response from the inventory server 106 acknowledging receipt of the inventory message. In some embodiments, the wireless connection device 104 may receive an update message containing an update for one or more of the electronic devices 102 at the location of the wireless connection device 104.

At block 312, the wireless connection device 104 determines whether an update message has been received from the inventory server 106. When an update message is received, the inventory method 300 proceeds with sending the update to the electronic devices 102 at block 314. Because the inventory server 106 will generally respond with an acknowledgement of the inventory message, the wireless connection device 104 may wait a predefined interval following such acknowledgement before determining no update message has been received. Alternatively, the acknowledgement or a separate no-update message may be received by the wireless connection device 104. Whenever it is determined that no update message has been received, the inventory reporting method 300 next proceeds to disconnect from the electronic devices 102 at block 316.

At block 314, the wireless connection device 104 proceeds to send a corresponding update message containing an update to the respective electronic devices 102 via the respective wireless connections 180 to cause the respective electronic devices 102 to update information stored in their memories 112. Such update messages may be sent only to specific electronic devices 102 based upon device parameters or device identifiers, which may be specified in the update message received from the inventory server 106. In some embodiments, the wireless connection device 104 may generate a wireless update message to send to one or more electronic devices 102 based upon update information received in an update message from the inventory server 106. In further embodiments, the wireless connection device 104 may determine whether the updates were successfully performed based upon update confirmation messages received from one or more electronic devices 102. In some such embodiments, the wireless connection device may further confirm the updates by sending a confirmation message to the inventory server 106.

At block 316, the wireless connection device 104 disconnects from the one or more electronic devices 102 in order to reduce power consumption by the electronic devices 102. The inventory reporting method 300 then ends. In some embodiments, the inventory reporting method 300 may be performed periodically by the wireless connection device 104.

Figure 3B:
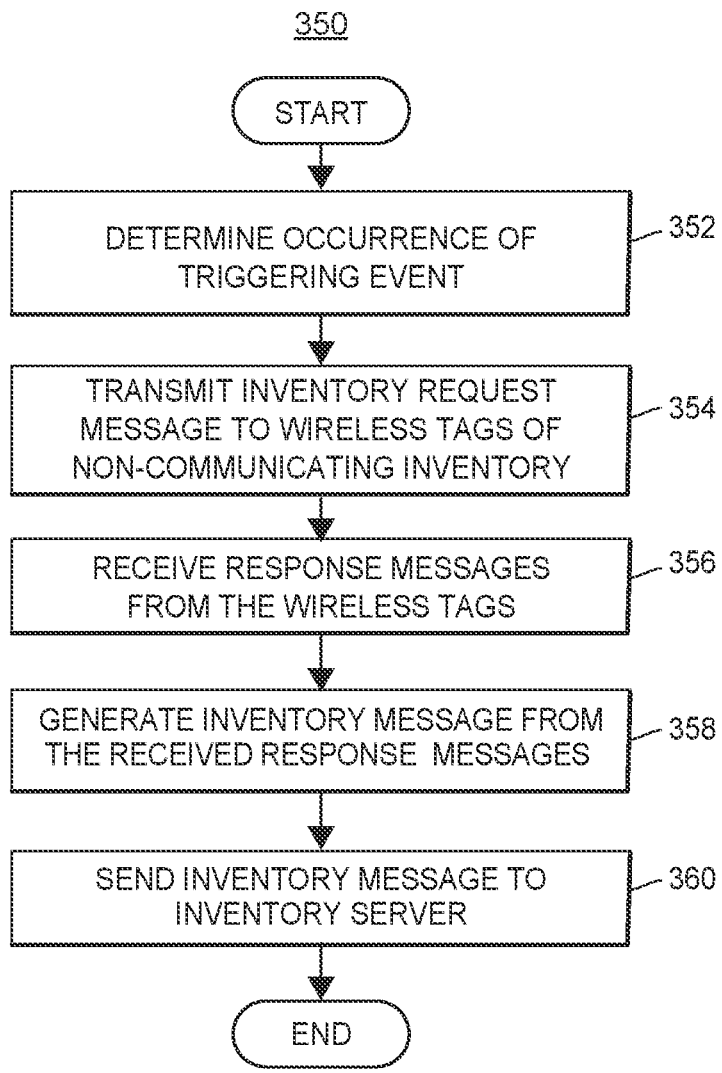

FIG. 3B illustrates a flow diagram of an exemplary inventory reporting method 350 implemented by a wireless connection device 104 to facilitate inventory monitoring and management. The wireless connection device (e.g., a mobile computing device or other connection component) may implement the method 350 to obtain inventory information from one or more wireless tags 109 of corresponding non-communicating inventory items 108 by respective wireless connections 180 and to send such inventory information to an inventory server 106. Various aspects of the method 350 may be performed by software applications, routines, or modules running on the wireless connection device 104, such as the communication application 142. The method 350 may be implemented periodically or upon occurrence of triggering events (e.g., location of a mobile computing device at a retail location known to the communication application 142 to be associated with an inventory of relevant electronic devices 102).

The inventory reporting method 350 begins with determining the occurrence of a triggering event (block 352). Based upon the occurrence of the triggering event, the wireless connection device 104 sends one or more inventory request messages to nearby wireless tags 109 (block 354) to cause the wireless tags 109 to send response messages. Upon receiving the response messages from the one or more wireless tags 109 (block 356), the wireless connection device 104 generates an inventory message based upon such response messages (block 358). The wireless connection device 104 then sends the inventory message to the inventory server 106 (block 360). Additional or alternative aspects may be included in some embodiments.

At block 352, the wireless connection device 104 determines the occurrence of a triggering event associated with a triggering condition. Such triggering condition may be associated with time, location, receipt of a triggering message, or other relevant conditions related to causing the wireless connection device 104 to determine the inventory at a location via wireless communication. In some embodiments, the triggering condition comprises a time interval, such that the triggering event occurs periodically. In further embodiments, the triggering condition comprises a location, such that a wireless connection device 104 that is mobile (e.g., a mobile computing device such as a smartphone) determines occurrence of a triggering event when the wireless connection device 104 determines it is located at a geospatial location associated with a retail location where non-communicating inventory items 108 may be present. Such device location may be achieved by determining a geospatial location of the wireless communication device 104 (e.g., by a GPS unit) and determining such geospatial location is within a set of geospatial locations associated with retail locations associated with inventory of non-communicating inventory items 108. In yet further embodiments, the triggering condition comprises receiving a location-identifying message via the communication interface 140, such as an advertising packet from a BLE beacon disposed at a merchandising display 150. In some such embodiments, the location-identifying message may include a retail location identifier specifically identifying the retail location associated with the BLE beacon. In further embodiments, the triggering event may be associated with multiple conditions, such as a combination of time intervals or the combination of a time interval with a location. For example, the triggering conditions may be configured to include both a periodic element and a limitation of only determining a triggering event during certain hours of retail operation in order to reduce power consumption.

At block 354, the wireless connection device 104 transmits one or more inventory request messages to attempt to connect with any nearby wireless tags 109 within the wireless communication range of the wireless connection device 104. Each of the one or more inventory request messages may be directed to specific wireless tags 109 or may be broadcast to any nearby wireless tags 109. In some embodiments, an inventory request message is broadcast using either an RFID interrogation signal or a BLE advertising packet or scan request. In some embodiments, the wireless connection device 104 transmits multiple inventory request messages using different communication signals (e.g., different frequency ranges or different protocols) in order to communicate with different types of wireless tags 109 or electronic devices 102. As discussed above, each wireless tag 109 is configured to receive an inventory request message and respond by transmitting a response message. In some embodiments, the wireless tags 109 may be configured to generate such response messages to provide current information requested by inventory request messages. Alternatively, the wireless tags 109 may simply respond with predefined response messages, such as by transmitting or backscattering response messages containing SKUs or EPCs identifying the non-communicating inventory items 108 associated with such wireless tags 109.

At block 356, the wireless connection device 104 receives one or more response messages from the one or more wireless tags 109 within wireless communication range of the wireless connection device 104. Each response message from a wireless tag 109 indicates the presence of the corresponding non-communicating inventory item 108 at a location associated with the wireless connection device 104 at the time of such response message. The response messages may further contain information regarding the non-communicating inventory items 108, such as information regarding a type of the inventory item. In some embodiments, the one or more response messages each contain a plurality of bits comprising an SKU or EPC associated with corresponding non-communicating inventory item 108, thus enabling the wireless connection device 104 to determine levels of various types of inventory at the location.

At block 358, the wireless connection device 104 generates an inventory message including inventory information regarding the inventory of non-communicating inventory items 108 at the location of the wireless connection device 104. The inventory message is generated based upon the one or more response messages received from the one or more wireless tags 109. Thus, the inventory message is distinct form each such response message and indicates a level of inventory at the location at a time of the inventory reporting method 350. In some embodiments, the inventory message includes one or more indications of both a number and type of non-communicating inventory items 108, such as a count of response messages for each distinct SKU received by the wireless connection device 104 in a plurality of response messages. For example, the wireless connection device 104 may count four response messages containing a first SKU and two response messages containing a second SKU, in which case the inventory message may indicate the respective counts for each of the first and second SKUs as indicating inventory of four inventory items of a first type and two inventory items of a second type.

The inventory message further includes an indication of the location of a retail location associated with the inventory. Such location may be implicitly indicated by an identifier of a wireless connection device 104 known to be located at a particular retail location or may be explicitly indicated by inclusion of a geospatial location identifier or coordinates. In various embodiments, the wireless connection device 104 determines its location at a time associated with the inventory message and includes an indication of the location in the inventory message. For example, the wireless connection device 104 may include a Global Positioning System (GPS) unit to determine a GPS location coordinate of the wireless connection device 104. In some embodiments, the wireless connection device 104 determines its location by accessing a recently determine geospatial location (e.g., a GPS location coordinate used in determining occurrence of the triggering event). However determined, such location determination is particularly advantageous when the wireless connection device 104 is a mobile computing device running a communication application 142 associated with the inventory server 104, such that the mobile computing device is only temporarily located at the retail location. In some embodiments, however, the wireless connection device 104 need not determine or include an indication of location in the inventory message. For example, the inventory message may include a location identifier received in a location-identifying message from a BLE beacon, from which the inventory server 106 may determine the location of the wireless connection device 104. In some embodiments, the inventory server 106 may determine the location of the wireless connection device 104 based upon a network address of the wireless connection device 104 or based upon a retail location being previously recorded in device records of a plurality of electronic devices 102 identified in the inventory message.

At block 360, the wireless connection device 104 sends the inventory message to the inventory server 106 via the communication network 190. To send the inventory message, the wireless connection device 104 may first establish a communication connection with the inventory server 106 via the communication network 190. In various embodiments, the wireless connection device 104 may send inventory messages as they are generated, or the wireless connection device 104 may send inventory messages in batches, depending upon the network conditions. The wireless connection device 104 will typically receive a response from the inventory server 106 acknowledging receipt of the inventory message. In some embodiments, the wireless connection device 104 may receive an update to its executable instructions from the inventory server 106, such as an updated to cause adjust the triggering conditions used by the wireless connection device 104 based upon current inventory levels. The inventory reporting method 350 then ends. In some embodiments, the inventory reporting method 350 may be performed by the wireless connection device 104 periodically or whenever the triggering event occurs.

Figure 4A:
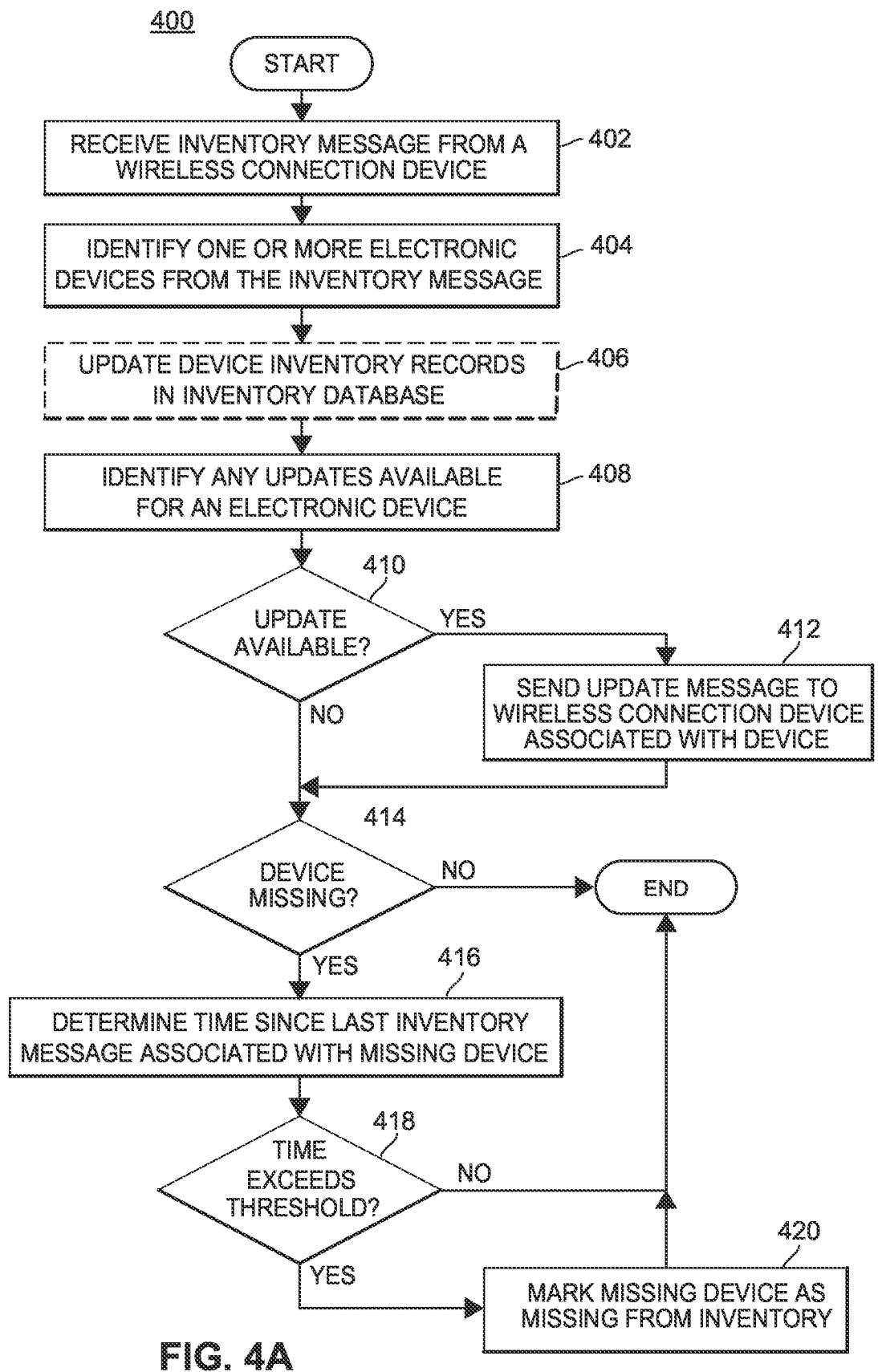
FIGS. 4A-B illustrate flow diagrams of exemplary inventory update methods implemented by an inventory server, according to certain embodiments.

FIG. 4A illustrates a flow diagram of an exemplary inventory update method 400 implemented by an inventory server 106 to facilitate inventory monitoring and management. The inventory server 106 may implement the method 400 to receive inventory information regarding one or more electronic devices 102 at a location from a wireless connection device 104 via the communication network 190. Various aspects of the method 400 may be performed by software applications, routines, or modules running on the inventory server 106, such as the inventory application 172, to access and update records in the database 174.

The inventory update method 400 begins with receiving an inventory message from a wireless connection device 104 (block 402). Upon receiving such inventory message, the inventory server 106 identifies one or more electronic devices 102 associated with the inventory message (block 404). Based upon the content of the inventory message, the inventory server 106 may update device records associated with the electronic devices 102 in the database 174 (block 406). The inventory server 106 next attempts to identify any available updates for the electronic devices 102 (block 408). When an update is determined to be available (block 410), the inventory server 106 sends an update message to the wireless connection device 104 (block 412) before proceeding. If an electronic device 102 previously associated with a location indicated by the inventory message is determined to be missing (block 414), the inventory server 106 next determines a time since the last inventory message including the missing electronic device 102 was received (block 416). If the determined time exceeds a missing device threshold (block 418), the missing electronic device 102 is recorded as missing from the inventory in the database 174 (block 420). The method 400 then ends. Additional or alternative aspects may be included in some embodiments.

At block 402, the inventory server 106 receives an inventory message from a wireless connection device 104 via the communication network 190. The inventory message includes an indication of at least one electronic device 102 and may include any additional inventory information relating to one or more electronic devices 102, as discussed above. The inventory message also includes an indication of a location or other information from which the inventory server 106 may determine a retail location of the one or more electronic devices 102, which may be part of the inventory information.

At block 404, the inventory server 106 identifies one or more electronic devices 102 associated with the received inventory message. The electronic devices 102 may be determined based upon identifiers included in the inventory message. In embodiments in which only changed device status information is sent to the inventory server 106 by the wireless connection device 104, one or more unchanged electronic devices 102 may be identified as being unchanged at the retail location. Thus, the inventory server 106 may determine the electronic devices 102 in inventory at the retail location associated with the wireless connection device 104.

At block 406, in some embodiments, the inventory server 106 updates device records associated with the identified electronic devices 102 in the database 174. The device records corresponding to the one or more electronic devices 102 may be updated to include an indication of presence or absence of the electronic devices 102 at an indicated retail location, as well as recording device status information in some embodiments. Thus, the inventory server 106 may maintain updated records of which electronic devices 102 are in inventory at a retail location associated with the inventory message, as well as identifying electronic devices 102 not detected in inventory. In order to update the device records, the inventory server 106 may determine a location (e.g., a retail location) associated with the wireless connection device 104, which may be extracted from the inventory message or determined based upon data included in the inventory message. For example, the inventory message may include GPS location coordinates, which may be compared against known retail location coordinates to determine a best match. As another example, an Internet Protocol (IP) address of the wireless connection device 104 may be identified in the inventory message and either compared against known IP addresses associated with retail locations or used to determine a physical network location of the wireless connection device 104. As yet another example, identifiers of electronic devices 102 included in the inventory message may be used to determine a likely retail location based upon a concurrence of the last recorded retail locations of the electronic devices 102 in respective device records of the electronic devices 102 in the database 174.

At block 408, the inventory server 106 identifies available updates for any of the electronic devices 102 identified from the inventory message. Under some circumstances, multiple updates may be available for multiple types of updatable electronic device 102 indicated in the received inventory message. The updates may be identified based upon device type (e.g., model or version) of the electronic devices 102, information regarding current versions of software installed on the electronic devices 102, device status (e.g., battery level, time in inventory, registration status, or operating parameters) of the electronic devices 102, or location of the electronic devices 102. For example, an electronic device 102 indicated as purchased or registered to a consumer may be removed from inventory and updated to end inventory reporting, as discussed above. As discussed above, updates may include updates to data 124 stored in the memories 112 of electronic devices 102, which data may be updated to adjust device operation to improve performance or meet requirements of jurisdictions in which the electronic devices 102 are located. Software updates (e.g., firmware updates) or other types of updates may also be identified in some embodiments.

At block 410, the inventory server 106 determines whether any updates are available for the electronic devices 102. When an update is available for at least one of the electronic devices 102, the method 400 proceeds to send an update message to the wireless connection device 104 associated with the updateable electronic device 102 at block 412. When no update is available or any update messages have been sent, the method 400 proceeds to determine whether any electronic devices 102 are missing at block 414.

At block 412, the inventory server 106 prepares and sends one or more update messages to the wireless connection device 104 via the communication network 190 to update the updateable electronic devices 102. In some embodiments, the inventory server 106 may generate an update message containing an update for one or more electronic devices 102, which may be specified in the update message. In further embodiments, the inventory server 106 may send a predetermined update message from memory 162 to the wireless connection device 104 to avoid generating a large number of update messages when updating a large number of electronic devices 102 in a short time interval.

At block 414, the inventory server 106 determines whether an electronic device 102 previously associated with a location indicated by the inventory message is missing from the inventory information in the inventory message. An electronic device 102 may be identified as missing if the missing electronic device 102 had previously been identified and recorded in the database 174 as being in inventory at the retail location associated with the inventory message, but the missing electronic device 102 is not indicated as being present at the location by the inventory message. For example, a missing electronic device 102 may have been indicated as being present in a previous inventory message from the wireless connection device 104, but an indication of the missing electronic device 102 may be lacking in a current inventory message from the wireless connection device 104. This may indicate that the missing electronic device 102 has been removed from inventory at the retail location or that the missing electronic device 102 is otherwise prevented from communicating with the wireless connection device 104. If no electronic devices 102 are missing, the method 400 terminates. If one or more electronic devices 102 are missing, the method 400 continues by determining how long each missing electronic device 102 has been missing at block 416.

At block 416, the inventory server 106 determines a time elapsed since a last inventory message included information regarding a missing electronic device 102. If multiple electronic devices 102 are missing, the elapsed times are determined for each missing electronic device 102. Such missing electronic devices 102 may be removed from inventory after being lost, stolen, damaged, or purchased. Alternatively, such missing electronic devices 102 may still be in inventory but may not have be included in the inventory message due to communication issues or because the missing electronic devices 102 did not wake or trigger device status messages to the wireless connection device 104. Thus, electronic devices 102 may appear missing at times. To avoid incorrectly record an electronic device 102 as missing due to temporary unavailability, a time threshold may be used to determine whether the electronic device 102 should be marked as missing.

At block 418, the inventory server 106 determines whether the determined elapsed time for any of the missing electronic devices 102 exceeds a missing device threshold. Such missing device threshold may be set to a sufficient duration such that it is unlikely that an electronic device 102 would fail to provide device status information to the inventory server 106 for such a duration. If any elapsed times exceed the missing device threshold, the inventory server 106 proceeds at block 420 to mark the corresponding missing electronic devices 102 as missing in the database 174. Marking such electronic devices 102 as missing may include recording a missing device status in corresponding device records of the missing electronic devices 102 in the database 174. If no elapsed times exceed the missing device threshold or after any missing electronic devices 102 with elapsed times exceeding the missing device threshold have been marked as missing, the inventory update method 400 ends.

Figure 4B:
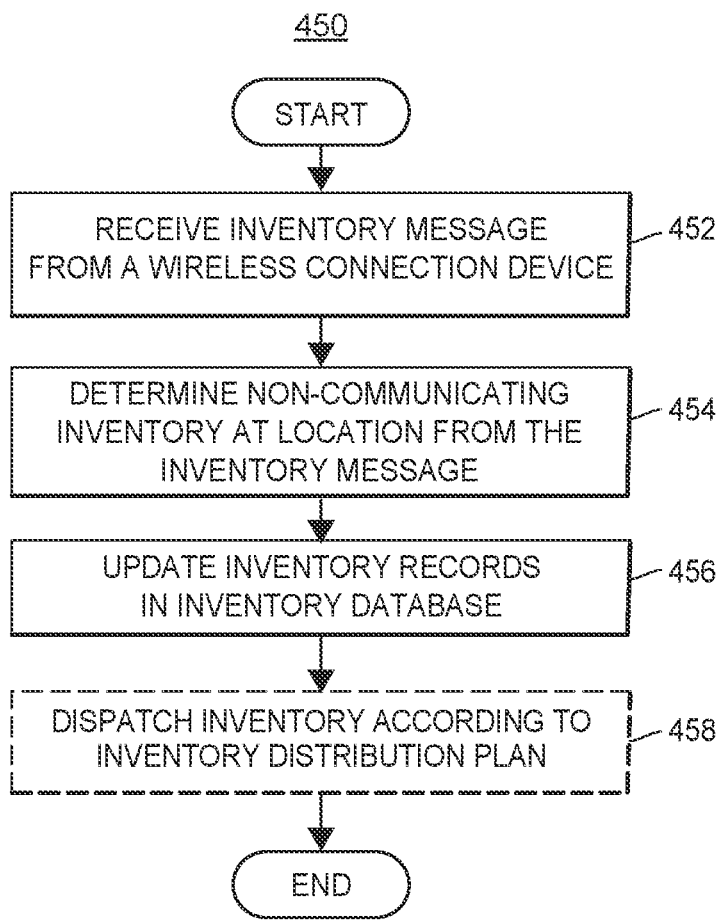

FIG. 4B illustrates a flow diagram of an exemplary inventory update method 450 implemented by an inventory server 106 to facilitate inventory monitoring and management. The inventory server 106 may implement the method 450 to receive inventory information regarding one or more non-communicating inventory items 108 at a location from a wireless connection device 104 via the communication network 190. Various aspects of the method 450 may be performed by software applications, routines, or modules running on the inventory server 106, such as the inventory application 172, to access and update records in the database 174.

The inventory update method 450 begins with receiving an inventory message from a wireless connection device 104 (block 452). Upon receiving such inventory message, the inventory server 106 determines inventory levels of one or more types of non-communicating inventory items 108 at a retail location associated with the inventory message (block 454). Based upon the content of the inventory message, the inventory server 106 may update inventory records associated with the non-communicating inventory items 108 in the database 174 (block 456). In some embodiments, the inventory server 106 further generates an inventory distribution plan based upon the inventory levels indicated by the inventory message and dispatches inventory to the retail location according to the inventory distribution plan. The method 450 then ends. Additional or alternative aspects may be included in some embodiments.

At block 452, the inventory server 106 receives an inventory message from a wireless connection device 104 via the communication network 190. The inventory message includes an indication of inventory levels of one or more types of non-communicating inventory items 108 at a retail location. In some embodiments, the inventory message includes additional inventory information relating to one or more non-communicating inventory items 108, as discussed above. The inventory message also includes an indication of a location or other information from which the inventory server 106 may determine a retail location associated with the inventory message (e.g., a retail location identifier or identifier of the wireless connection device 104), which may be part of the inventory information.

At block 454, the inventory server 106 determines current inventory levels of non-communicating inventory items 108 at the retail location indicated by the received inventory message. The inventory levels may be determined based upon inventory item identifiers included in the inventory message or may be directly extracted from the inventory message. In embodiments in which only changed device status information is sent to the inventory server 106 by the wireless connection device 104, the inventory levels of one or more unchanged types of inventory items may be identified as being unchanged at the retail location absent a change indication in the inventory message. Thus, the inventory server 106 may determine the inventory of one or more types of non-communicating inventory items 108 at the retail location associated with the wireless connection device 104 based upon the inventory message.

At block 456, the inventory server 106 updates inventory records associated with one or more types of non-communicating inventory items 108 in the database 174. Updating inventory record may include updating levels of types of inventor items at the retail location or updating records associated with specific inventory items (e.g., particularly identified inventory items). Thus, the inventory records corresponding to the retail location may be updated to include an indication of presence or absence of non-communicating inventory items 108 at the indicated retail location, as well as recording any other inventory information in some embodiments. Thus, the inventory server 106 may maintain updated records of which non-communicating inventory items 108 are in inventory at a retail location associated with the inventory message, as well as identifying non-communicating inventory items 108 not detected in inventory. Alternatively, the inventory server 106 may update records associated with types of inventory items (e.g., based upon SKUs of the inventory items) at the retail location, which may be more appropriate for lower value or high turnover inventory.

At block 458, in some embodiments, the inventory server 106 dispatches inventory to the retail location associated with the inventory message according to an inventory distribution plan. Additional inventory may be dispatched by the inventory server 106 to ensure sufficient inventory levels at the retail location. In some embodiments, the inventory server 106 determines the current inventory level for a type of inventory item at the retail location is below a threshold level, then generates an inventory distribution plan to send additional inventory to the retail location. Such inventory distribution plan may include shipping or otherwise distributing a certain number of one or more types of inventory items to the retail location from a warehousing or a manufacturing location. In some instances, direct replacement inventory items may not be readily available, so the inventory distribution plan may instead include substitute inventory items. In further embodiments, the inventory server 106 causes the distribution of the additional inventory to the retail location according to the inventory distribution plan by automatically generating inventory distribution orders, which may be shipping orders specifying inventory to be sent to the retail location. In some such embodiments, the inventory distribution orders may be presented to inventory distribution personnel for verification or authorization prior to implementation. The inventory update method 450 then ends.

Figure 5:
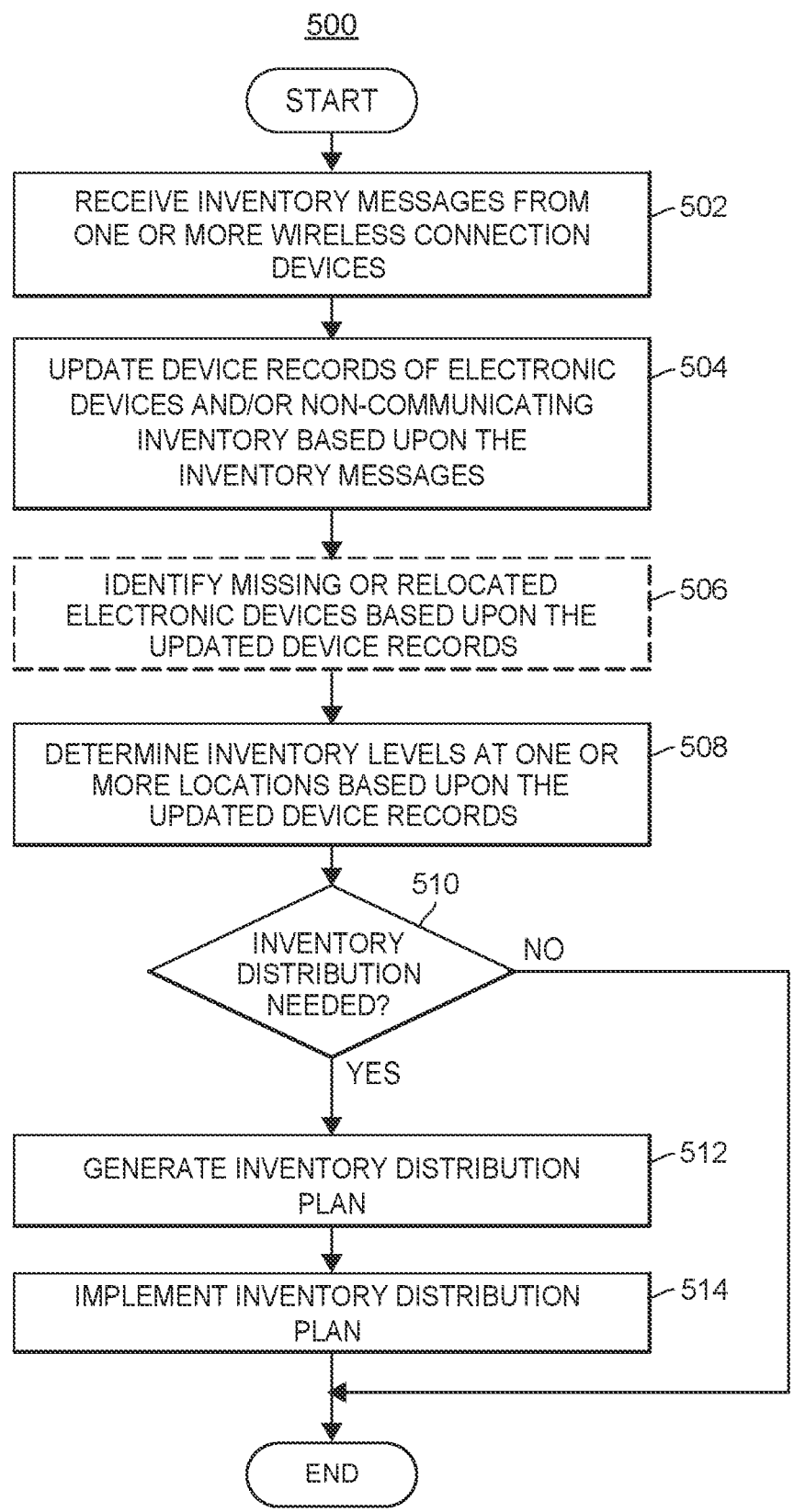
FIG. 5 illustrates a flow diagram of an exemplary inventory management method implemented by an inventory server, according to certain embodiments.

FIG. 5 illustrates a flow diagram of an exemplary inventory management method 500 implemented by an inventory server 106 to monitor and manage inventory of electronic devices 102 and/or non-communicating inventory items 108 at a plurality of locations based upon inventory information obtained from wireless connection devices 104. The inventory server 106 may implement the method 500 to receive inventory information regarding the plurality of inventory items at the plurality of locations from a plurality of wireless connection devices 104 via the communication network 190. Based upon this inventory information, the inventory server 106 may cause additional inventory to be shipped to various retail locations, as necessary to maintain adequate inventory levels. Various aspects of the method 500 may be performed by software applications, routines, or modules running on the inventory server 106, such as the inventory application 172.

The inventory management method 500 begins with receiving a plurality of inventory messages associated with one or more retail locations (block 502). Based upon the inventory information in the received inventory messages, the device records associated with the retail locations are updated in the database 174 (block 504). In some embodiments, the inventory server 106 may next identify missing or relocated electronic devices 102 based upon the updated device records (block 506). Inventory levels at the one or more retail locations are then determined (block 508) and used to determine whether distribution of existing or additional inventory is needed (block 510). If needed, an inventory distribution plan is generated (block 512) and implemented (block 514). The method 500 then ends. Additional or alternative aspects may be included in some embodiments.

At block 502, the inventory server 106 receives a plurality of inventory messages from one or more wireless connection devices 104 associated with one or more retail locations via the communication network 190. The inventory messages may be received over an interval of time (e.g., an hour or a day). Each of the inventory messages provides inventory information regarding inventory items (i.e., electronic devices 102, non-communicating inventory items 108, or a combination thereof) present in inventory or absent from inventory in a retail location.

At block 504, the inventory server 106 updates device records associated with electronic devices 102 and/or non-communicating inventory items 108 in the database 174 based upon the received inventory messages. In some embodiments, this includes recording inventory items remaining in inventory at a retail location. In other embodiments, the inventory server 106 may only update device records when changes to the status of inventory items or inventory levels occur. For example, the database 174 may store records of current inventory levels of a plurality of types of inventory items (including one or more types of electronic devices 102 and one or more types of non-communicating inventory items 108). Records of historical inventory levels may also be stored in the database 174 or in another data storage in some embodiments in order to facilitate inventory analysis and modeling for predictive purposes.

At block 506, in some embodiments, the inventory server 106 identifies missing or relocated electronic devices 102 based upon the updated device records associated with such electronic devices 102. Such information may be used in determining demand for different types of electronic devices 102 offered for sale at one or more retail locations, which may further be used for inventory distribution as discussed below. As discussed above, missing electronic devices 102 may be identified based upon an absence of an indication of such electronic devices 102 in an inventory message associated with a retail location after having previously been indicated in an earlier inventory message as being present in inventory at the retail location. In some embodiments, a transfer of an electronic device from one retail location to another retail location may be determined based upon inventory messages from wireless connection devices 104 associated with the two retail locations. As further discussed above, an electronic device 102 may not be marked as missing from inventory at a retail location until a sufficient time has passed to avoid excessive false determinations that the electronic device 102 is no longer in inventory at the retail location. In further embodiments, similar analysis of missing non-communicating inventory items 108 is performed by the inventory server 106 to determine missing (e.g., purchased or otherwise removed inventory) based upon inventory identifiers (e.g., SKUs or EPCs) contained in response messages from wireless tags 109.

At block 508, the inventory server 106 determines inventory levels at one or more retail locations based upon the updated device records associated with the inventory items (i.e., electronic devices 102, non-communicating inventory items 108, or a combination thereof). This may include determining inventory levels of multiple types of inventory items at the same retail location. In some embodiments, the total inventory of relevant types of inventory items at a retail location may be directly determined as a count of the relevant inventory items indicated in the most recent inventory message associated with the retail location. In further embodiments, inventory levels may include inventory items that have been indicated as being in inventory by at least one inventory message associated with the retail location within the missing device threshold (therefore making it uncertain whether the inventory items has been removed from the location or whether a transient communication failure has occurred). In yet further embodiments, a probability of each missing inventory item being in inventory may be assigned based upon the elapsed time (or number of inventory messages associated with the retail location) since the missing inventory item was indicated as being in inventory at the retail location. However determined, the inventory levels may be further used to determine whether additional inventory is needed.

At block 510, the inventory server 106 determines whether distribution of the existing or additional inventory is needed to maintain an adequate supply of the electronic devices 102 and/or non-communicating inventory items 108 at each of the retail locations. Such determination may be made based upon total inventory levels or may be made separately for each type of inventory item. In some embodiments, the determination of whether additional inventory should be distributed to a retail location may be made based in part upon an average rate at which inventory is removed (e.g., by purchase or otherwise) from inventory at a retail location using historical device records associated with the retail location. In some embodiments, historical device records may be compared against sales records to further identify additional metrics, such as rates of theft, damage, or returned inventory associated with a retail location. Such additional metrics may be used in determining inventory distribution plans, which may include determining to remove inventory or discontinue sales of certain types of inventory items at certain retail locations. If no such distribution is needed, the method 500 ends. If a distribution is determined to be necessary to maintain adequate inventory levels, the method 500 continues by determining and implementing an inventory distribution plan.

At block 512, the inventory server 106 generates an inventory distribution plan to supply the retail locations with adequate inventory of inventory items (i.e., electronic devices 102, non-communicating inventory items 108, or a combination thereof). Rates of sale or removal of inventory items generally or of specific types of electronic devices 102 or non-communicating inventory items 108 from inventory at retail locations may be used to determine such inventory distribution plan, such as by determining which retail locations require additional inventory or prioritizing inventory distribution to such retail locations. The inventory distribution plan may include resupplying inventory by shipping or delivering one or more types of inventory items to one or more retail locations. For example, the inventory distribution plan may include adjusting the number of a type of inventory items to be distributed to a retail location in its next shipment or may include adjusting the timing of the next shipment to the retail location by rescheduling a scheduled shipment to occur at an earlier time based upon low inventory levels. The inventory distribution plan may also be based in part upon additional metrics derived from analysis or historical device records associated with the retail locations. Thus, the inventory distribution plan may include removing inventory from certain retail locations or discontinuing sale of types of inventory items at the retail locations. In some embodiments, the inventory distribution plan may include transferring inventory from a first retail location to a second retail location.

At block 514, the inventory server 106 implements the inventory distribution plan to cause the inventories of the inventory items to be resupplied to adequate levels. Implementing the inventory distribution plan may include generating orders for shipment or delivery of inventory of electronic devices 102, non-communicating inventory items 108, or a combination thereof to one or more retail locations. For example, a prioritized list of shipments or deliveries of quantities of types of inventory items may be generated, which may further be sent to a fulfilment server or to relevant personnel. In some embodiments, implementing the inventory distribution plan may include determining and scheduling production of additional inventory items for shipment or delivery to the retail locations. Thus, inventory management and production management may be automatically adjusted in near real-time based upon monitored inventory levels at retail locations. After implementing the inventory distribution plan, the inventory management method 500 ends. In some embodiments, the inventory management method 500 may be implemented periodically (e.g., hourly or daily). Additionally or alternatively, the inventory method 500 may be implemented separately in batches for predefined distribution territories based on geography or type of retail location (e.g., specialty shop or general retailer).

Figure 6:
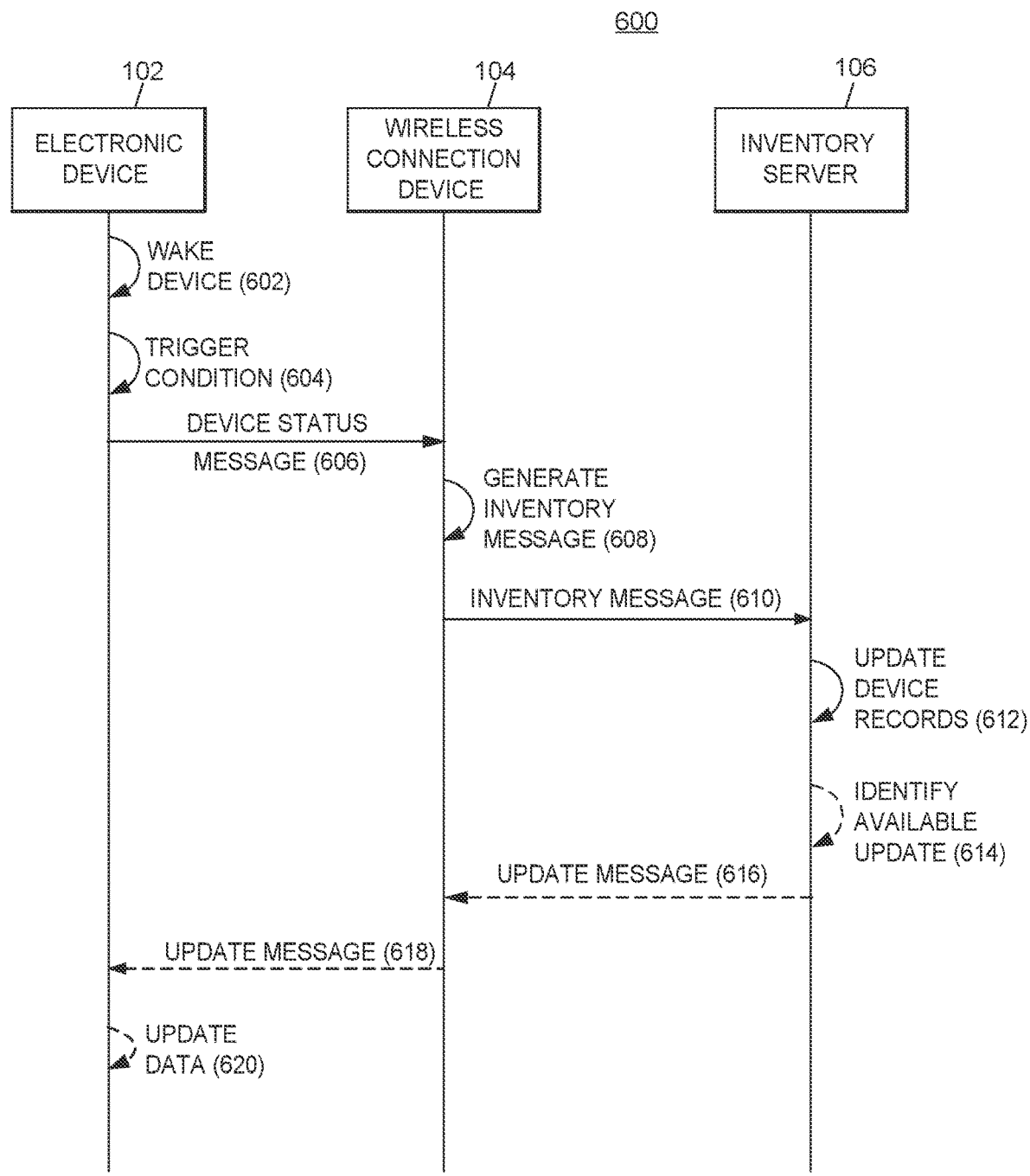
FIG. 6 illustrates a sequence diagram of an exemplary inventory monitoring and updating process implemented by the components of an inventory management system, according to certain embodiments.

FIG. 6 illustrates a sequence diagram of an exemplary inventory monitoring and updating process 600 implemented by the components of an inventory management system 100, according to certain embodiments of the techniques described above. The exemplary inventory monitoring and updating process 600 involves processing by and communication between an electronic device 102, a wireless connection device 104, and an inventory server 106. Device status information is communicated from the electronic device 102 (e.g., a vaporization device having wireless communication capabilities) to the wireless connection device 104 (e.g., a mobile computing device or other wireless connection component), which further communicates inventory information regarding the electronic device 102 to the inventory server 106. Additional or alternative aspects may be included in some embodiments, such as those discussed above.

The inventory monitoring and updating process 600 begins with the electronic device 102 waking from a low-power sleep mode (line 602). Once the electronic device 102 is in a high-power awake mode, it determines whether a trigger condition has occurred (line 604). When the trigger condition has occurred, the electronic device 102 sends a device status message 606 to the wireless connection device 104 via a wireless connection 180. Although not shown, the electronic device 102 may determine current status data and generate the device status message 606 from such device status data, as discussed above. Upon receiving the device status message 606, the wireless connection device 104 generates an inventory message (line 608). The inventory message may be generated based upon combining device status messages from a plurality of electronic devices 102 into one inventory message to the inventory server 106. The wireless connection device 104 then sends the inventory message 610 to the inventory server 106 via the communication network 190 to provide inventory information relating to the device status of at least the electronic device 102 to the inventory server 106. Upon receiving the inventory message 610, the inventory server 106 updates device records in the database 174 based upon the received inventory information (line 612).

In some embodiments, the inventory monitoring and updating process 600 may further include providing an update from the inventory server 106 to the electronic device 102. Thus, in such embodiments, the inventory server 106 identifies an available update for the electronic device 102 (line 614). Although not shown, the inventory server 106 may further generate an update message including the update, as discussed above. The inventory server 106 then sends the update message 616 to the wireless connection device 104 via the communication network 190. Upon receiving the update message 616, the wireless connection device 104 sends a corresponding update message 618 to the electronic device 102 via the wireless connection 180. When the electronic device 102 receives the update message 618, it updates data stored in its memory 112 (line 620). The updated data may include data 124 used by the electronic device 102 or software installed on the electronic device 102 (e.g., the device application 122). The inventory monitoring and updating process 600 then ends.

Figure 7A:
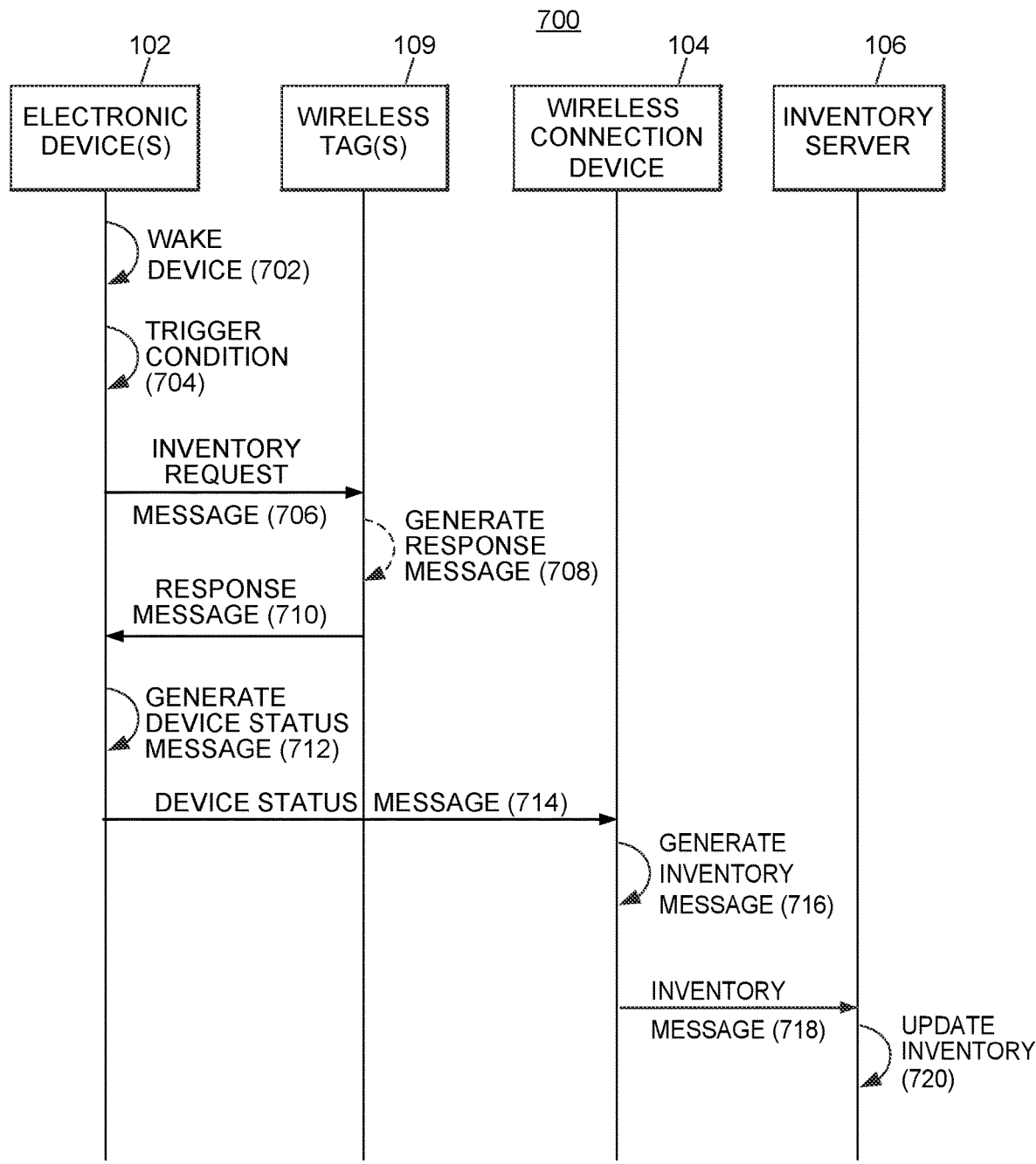
FIGS. 7A-B illustrate sequence diagrams of exemplary inventory monitoring processes implemented by the components of an inventory management system, according to certain embodiments.

FIG. 7A illustrates a sequence diagram of an exemplary inventory monitoring process 700 implemented by the components of an inventory management system 100, according to certain embodiments of the techniques described above. The exemplary inventory monitoring process 700 involves processing by and communication between an electronic device 102, at least one wireless tag 109 of a non-communicating inventory item 108, a wireless connection device 104, and an inventory server 106. Inventory information is generated and communicated from the electronic device 102 (e.g., a vaporization device having wireless communication capabilities) to the wireless connection device 104 (e.g., a mobile computing device or other wireless connection component), which further communicates inventory information regarding the electronic device 102 and the non-communicating inventory item 108 to the inventory server 106. Additional or alternative aspects may be included in some embodiments, such as those discussed above.

The inventory monitoring process 700 begins with the electronic device 102 waking from a low-power sleep mode (line 702). Once the electronic device 102 is in a high-power awake mode, it determines whether a trigger condition has occurred (line 704). When the trigger condition has occurred, the electronic device 102 transmits an inventory request message 706 via one or more wireless connections 180. Such inventory request message 706 is received by one or more wireless tags 109. In response to receiving the inventory request message 706, in some embodiments, the one or more wireless tags 109 generate a response message (line 708). The response message may include information requested by the inventory request message 706. Alternatively, the one or more wireless tags 109 simply access previously stored data for transmission as a response to the inventory request message 706. In either case, each of the one or more wireless tags 109 transmits a response message 710 in response to receiving the inventory request message 706 to the electronic device 102 via a wireless connection 180. After receiving the one or more response messages 710 from the one or more wireless tags 109, the electronic device 102 generates a device status message including inventory information regarding the one or more non-communicating inventory items 108 indicated in such response messages 710 (line 712). The electronic device 102 then sends the device status message 714 to the wireless connection device 104 via a wireless connection 180.

Upon receiving the device status message 714, the wireless connection device 104 generates an inventory message (line 608). The inventory message is generated by extracting and processing inventory information from the device status message 714 in order to include inventory information regarding the one or more non-communicating inventory items 108 indicated by the response messages 710 from the corresponding one or more wireless tags 109. In some embodiments, the inventory message is generated by processing and combining device status messages from a plurality of electronic devices 102 into one inventory message to the inventory server 106, which may include deduplicating inventory information from wireless tags 109 responding to multiple inventory request messages 706 from multiple electronic devices 102. The wireless connection device 104 then sends the inventory message 718 to the inventory server 106 via the communication network 190 to provide inventory information relating to at least the one or more non-communicating inventory items 108 to the inventory server 106. Upon receiving the inventory message 718, the inventory server 106 updates inventory records in the database 174 based upon the received inventory information (line 720). The inventory monitoring process 700 then ends.

Figure 7B:
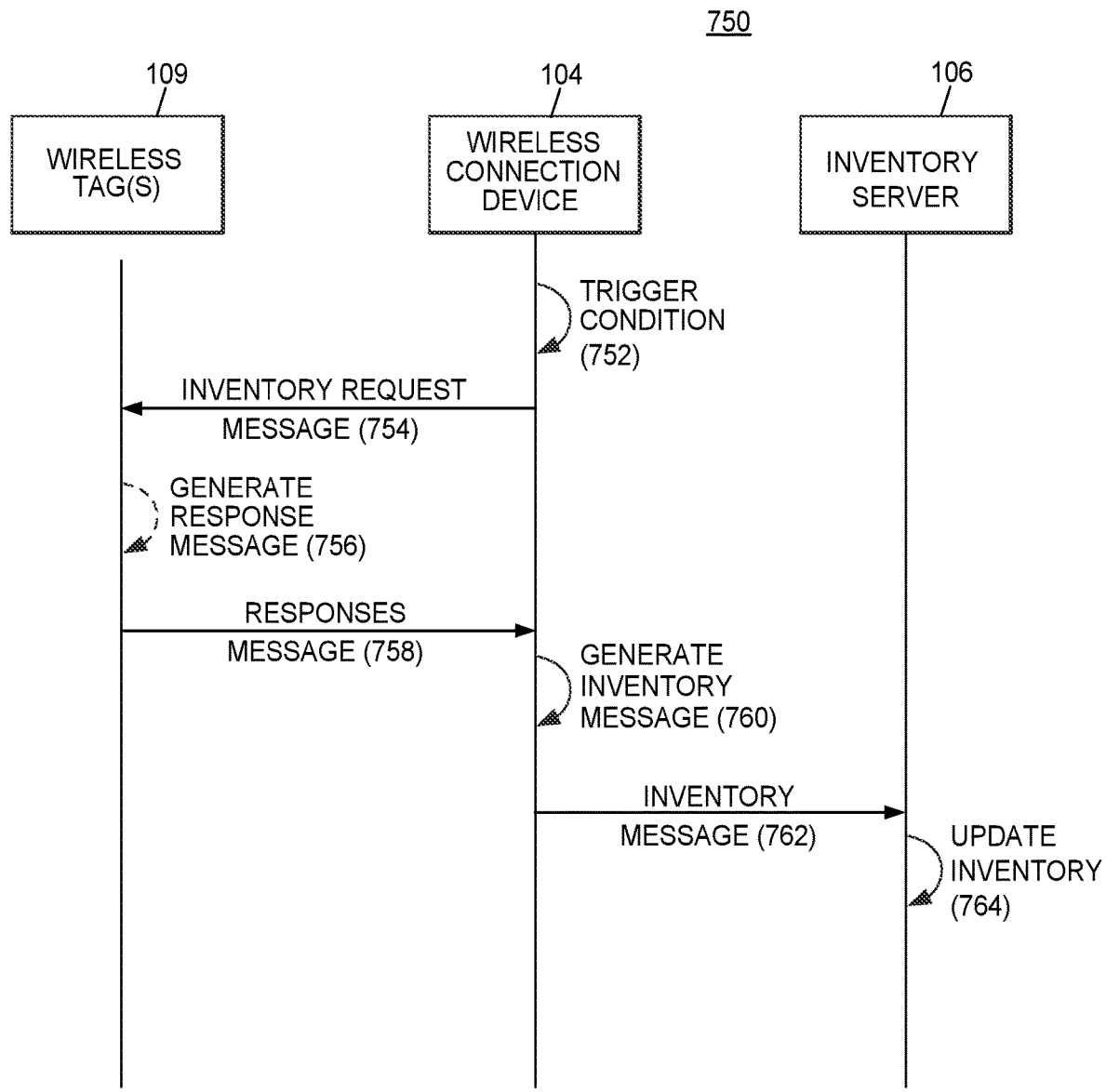

FIG. 7B illustrates a sequence diagram of an exemplary inventory monitoring process 750 implemented by the components of an inventory management system 100, according to certain embodiments of the techniques described above. The exemplary inventory monitoring process 750 involves processing by and communication between at least one wireless tag 109 of a non-communicating inventory item 108, a wireless connection device 104, and an inventory server 106. Inventory information is generated and communicated from the wireless connection device 104 (e.g., a mobile computing device or other wireless connection component) to the inventory server 106. Additional or alternative aspects may be included in some embodiments, such as those discussed above.

The inventory monitoring process 750 begins with the wireless connection device 104 determining the occurrence of a trigger condition (line 752), as discussed above. Upon determining the trigger condition has occurred, the wireless connection device 104 transmits an inventory request message 754 via one or more wireless connections 180. Such inventory request message 754 is received by one or more wireless tags 109. In response to receiving the inventory request message 754, in some embodiments, the one or more wireless tags 109 generate a response message (line 756). The response message may include information requested by the inventory request message 754. Alternatively, the one or more wireless tags 109 simply access previously stored data for transmission as a response to the inventory request message 754. In either case, each of the one or more wireless tags 109 transmits a response message 758 in response to receiving the inventory request message 754 to the wireless connection device 104 via a wireless connection 180. After receiving the one or more response messages 758 from the one or more wireless tags 109, the wireless connection device 104 generates an inventory message including inventory information regarding the one or more non-communicating inventory items 108 indicated in such response messages 758 (line 760). The wireless connection device 104 then sends the inventory message 762 to the inventory server 106 via the communication network 190 to provide inventory information relating to at least the one or more non-communicating inventory items 108 to the inventory server 106. Upon receiving the inventory message 762, the inventory server 106 updates inventory records in the database 174 based upon the received inventory information (line 764). The inventory monitoring process 750 then ends.

Although individual operations of one or more methods are illustrated and described as separate operations, one or more of the individual operations may be performed concurrently, and nothing requires that the operations be performed in the order illustrated. Structures and components presented as separate components in example configurations may be implemented as a combined structure or component. Similarly, structures and components presented as a single component may be implemented as separate components. These and other variations, modifications, additions, and improvements fall within the scope of the subject matter herein. Further, while several examples have been disclosed herein, any features from any examples may be combined with or replaced by other features from other examples. Moreover, while several examples have been disclosed herein, changes may be made to the disclosed examples without departing from the scope of the disclosed innovation.

To the extent that any term recited in the claims at the end of this disclosure is referred to in this disclosure in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112(f).

What is claimed is:

1. A computer-implemented method for automatically monitoring inventory, comprising:
   determining, by a processor of an electronic device, occurrence of a triggering event associated with a triggering condition;
   transmitting, by a wireless communication component of the electronic device, one or more inventory request messages to a plurality of wireless tags within a wireless communication range of the electronic device;
   receiving, by the wireless communication component of the electronic device, a plurality of response messages from the plurality of wireless tags in response to receipt of the one or more inventory request messages by the plurality of wireless tags, wherein each of the plurality of response messages indicates an inventory item associated with the respective wireless tag;
   generating, by the processor of the electronic device, a combined inventory message based upon the plurality of response messages from the plurality of wireless tags, wherein the combined inventory message includes information regarding the electronic device and additional information regarding the plurality of inventory items associated with the plurality of wireless tags, wherein the information regarding the electronic device includes an identifier of the electronic device and additional device status data including at least a software version of the electronic device; and
   transmitting, by the wireless communication component of the electronic device, the combined inventory message to a wireless connection device, wherein the combined inventory message causes the wireless connection device to generate and send to an inventory server via a communication network an inventory message indicating presence of the electronic device and presence of the plurality of inventory items at a location associated with the wireless connection device.

2. The computer-implemented method of claim 1, further comprising:
   receiving, by the wireless communication component of the electronic device from the wireless connection device, an inventory request message distinct from the one or more inventory request messages,
   wherein the triggering event comprises receipt of the inventory request message from the wireless connection device.

3. The computer-implemented method of claim 2, wherein:
   the wireless connection device comprises a mobile computing device running an application associated with the inventory server; and
   the inventory message further contains an indication of the location associated with the wireless connection device as a geospatial location of the mobile computing device at a time of determining the occurrence of the triggering event.

4. The computer-implemented method of claim 2, wherein:
   the wireless connection device further receives one or more additional combined inventory messages from one or more additional electronic devices at the location in response to the inventory request message;
   the inventory message comprises the following: the identifier of the electronic device, one or more identifiers of the plurality of inventory items, one or more additional identifiers of the one or more additional electronic devices.

5. The computer-implemented method of claim 4, wherein:
   the one or more additional combined inventory messages include one or more indications of at least one of the plurality of inventory items; and
   the at least one of the plurality of inventory items are deduplicated in the inventory message.

6. The computer-implemented method of claim 1, further comprising:
   receiving, at the inventory server via the communication network, the inventory message from the wireless connection device; and
   determining, by one or more processors of the inventory server, current inventory at the location associated with the wireless connection device based upon the inventory message.

7. The computer-implemented method of claim 1, wherein each of the wireless tags comprises a radio frequency identification (RFID) tag disposed within or affixed to packaging of the respective inventory item.

8. The computer-implemented method of claim 1, wherein each of the plurality of response messages includes a plurality of bits comprising a stock keeping unit (SKU) identifying a type of the respective inventory item associated with the respective wireless tag transmitting such response message.

9. The computer-implemented method of claim 1, wherein the combined inventory message includes an indication of both a number of the plurality of inventory items and a type of the plurality of inventory items.

10. A system for automatically monitoring inventory, comprising:
an electronic device having (i) a processor, (ii) a wireless communication component, and (iii) a memory operatively connected to the processor and storing executable instructions that, when executed by the processor, cause the electronic device to:
determine occurrence of a triggering event associated with a triggering condition;
transmit one or more inventory request messages via the wireless communication component to a plurality of wireless tags within a wireless communication range of the electronic device;
receive a plurality of response messages from the plurality of wireless tags via the wireless communication component in response to receipt of the one or more inventory request messages by the plurality of wireless tags, wherein each of the plurality of response messages indicates an inventory item associated with the respective wireless tag;
generate a combined inventory message based upon the plurality of response messages from the plurality of wireless tags, wherein the combined inventory message includes information regarding the electronic device and additional information regarding the plurality of inventory items associated with the plurality of wireless tags, wherein the information regarding the electronic device includes an identifier of the electronic device and additional device status data including at least a software version of the electronic device; and
transmit the combined inventory message via the wireless communication component to a wireless connection device, wherein the combined inventory message causes the wireless connection device to generate and send to an inventory server via a communication network an inventory message indicating presence of the electronic device and presence of the plurality of inventory items at a location associated with the wireless connection device.

11. The system of claim 10, wherein the triggering event comprises receipt of an inventory request message distinct from the one or more inventory request messages via the wireless communication component from the wireless connection device.

12. The system of claim 10, wherein:
each of the wireless tags comprises a radio frequency identification (RFID) tag disposed within or affixed to packaging of the respective inventory item; and
the wireless communication component comprises an RFID transceiver.

13. The system of claim 10, wherein:
each of the wireless tags comprises a Bluetooth Low Energy (BLE) communication tag disposed within or affixed to packaging of the respective inventory item; and
the wireless communication component comprises a BLE transceiver.

14. The system of claim 10, further comprising:
the inventory server having (i) one or more processors and (iii) a program memory operatively connected to the one or more processors and storing processor-executable instructions that, when executed by the one or more processors, cause the inventory server to:
receive, the inventory message from the wireless connection device via the communication network; and
determine current inventory at the location associated with the wireless connection device based upon the inventory message.

15. The system of claim 10, wherein the combined inventory message includes an indication of both a number of the plurality of inventory items and a type of the plurality of inventory items.

16. The system of claim 10, wherein the electronic device comprises a vaporization device in inventory at the location.

17. A tangible, non-transitory computer-readable medium storing executable instructions for automatically monitoring inventory that, when executed by one or more processors of electronic device, cause the electronic device to:
determine occurrence of a triggering event associated with a triggering condition;
transmit one or more inventory request messages via a wireless communication component of the electronic device to a plurality of wireless tags within a wireless communication range of the electronic device;
receive a plurality of response messages from the plurality of wireless tags via the wireless communication component in response to receipt of the one or more inventory request messages by the plurality of wireless tags, wherein each of the plurality of response messages indicates an inventory item associated with the respective wireless tag;
generate a combined inventory message based upon the plurality of response messages from the plurality of wireless tags, wherein the combined inventory message includes information regarding the electronic device and additional information regarding the plurality of inventory items associated with the plurality of wireless tags, wherein the information regarding the electronic device includes an identifier of the electronic device and additional device status data including at least a software version of the electronic device; and
transmit the combined inventory message via the wireless communication component to a wireless connection device, wherein the combined inventory message causes the wireless connection device to generate and send to an inventory server via a communication network an inventory message indicating presence of the electronic device and presence of the plurality of inventory items at a location associated with the wireless connection device.

18. The tangible, non-transitory computer-readable medium of claim 17, wherein the triggering event comprises receipt of an inventory request message distinct from the one or more inventory request messages via the wireless communication component from the wireless connection device.

19. The tangible, non-transitory computer-readable medium of claim 17, wherein:
each of the wireless tags comprises a radio frequency identification (RFID) tag disposed within or affixed to packaging of the respective inventory item; and
each of the plurality of response messages includes a plurality of bits comprising a stock keeping unit (SKU) identifying a type of the respective inventory item associated with the respective wireless tag transmitting such response message.

20. The tangible, non-transitory computer-readable medium of claim 17, wherein the combined inventory message includes an indication of both a number of the plurality of inventory items and a type of the plurality of inventory items.

* * * * *